US012497368B2

(12) United States Patent
Han et al.

(10) Patent No.: US 12,497,368 B2
(45) Date of Patent: Dec. 16, 2025

(54) ARYLAZO-HETEROARYL COMPOUNDS AND THEIR USE FOR LONG-TERM THERMAL ENERGY STORAGE

(71) Applicants: BRANDEIS UNIVERSITY, Waltham, MA (US); IMPERIAL COLLEGE INNOVATIONS LIMITED, London (GB); MASSACHUSETTS INSTITUTE OF TECHNOLOGY, Cambridge, MA (US)

(72) Inventors: Ggoch Ddeul Han, Waltham, MA (US); Mihael A. Gerkman, Waltham, MA (US); Rosina Gibson, London (GB); Matthew J. Fuchter, London (GB); Jeffrey C. Grossman, Cambridge, MA (US)

(73) Assignees: BRANDEIS UNIVERSITY, Waltham, MA (US); IMPERIAL COLLEGE INNOVATIONS LIMITED, London (GB); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 718 days.

(21) Appl. No.: 17/797,204

(22) PCT Filed: Feb. 3, 2021

(86) PCT No.: PCT/US2021/016381
§ 371 (c)(1),
(2) Date: Aug. 3, 2022

(87) PCT Pub. No.: WO2021/158638
PCT Pub. Date: Aug. 12, 2021

(65) Prior Publication Data
US 2023/0053197 A1   Feb. 16, 2023

Related U.S. Application Data

(60) Provisional application No. 62/969,634, filed on Feb. 3, 2020.

(51) Int. Cl.
C07D 231/38 (2006.01)
C09K 5/06 (2006.01)
F28D 20/02 (2006.01)

(52) U.S. Cl.
CPC ............ C07D 231/38 (2013.01); C09K 5/063 (2013.01); F28D 20/02 (2013.01); C07B 2200/09 (2013.01)

(58) Field of Classification Search
CPC ....... C07D 231/38; C09K 5/063; F28D 20/02; C07B 2200/09
(Continued)

(56) References Cited

U.S. PATENT DOCUMENTS 4,159,265 A   6/1979  Sommer et al.
10,390,531 B2  8/2019  Doyle et al.
(Continued)

FOREIGN PATENT DOCUMENTS

FR     2721975 A1    1/1996
WO   2020/227227 A1  11/2020
WO   2022/169879 A1   8/2022

OTHER PUBLICATIONS

International Search Report and Written Opinion for corresponding Application No. PCT/US2021/016381 (mailed Apr. 29, 2021).
(Continued)

*Primary Examiner* — Ruiyun Zhang
(74) *Attorney, Agent, or Firm* — CANTOR COLBURN LLP

(57) ABSTRACT

The present invention relates to a compound of Formula (I): wherein $R^1$, $R^2$, m, n, p, Q, X, Y, W, and "A" are as described herein. The present invention also relates to a process for preparation of a compound of Formula (I). Also disclosed is
(Continued)

a thermal-storage device comprising one or more compounds of Formula (I) and a method of storing energy.

20 Claims, 16 Drawing Sheets

(58) Field of Classification Search
USPC .......................................................... 524/17
See application file for complete search history.

(56) References Cited

U.S. PATENT DOCUMENTS

| | | |
|---|---|---|
| 2007/0211110 A1 | 9/2007 | Iftime et al. |
| 2008/0066982 A1 | 3/2008 | Kobayashi et al. |
| 2013/0202538 A1 | 8/2013 | Herges et al. |
| 2017/0158898 A1 | 6/2017 | Xiao et al. |
| 2018/0347419 A1 | 12/2018 | Furuishi et al. |
| 2022/0220871 A1 | 7/2022 | Han et al. |

OTHER PUBLICATIONS

Calbo et al., "Tuning Azoheteroarene Photoswitch Performance Through Heteroaryl Design," J. Am. Chem. Soc. 139:1261-1274 (2017).

Chu et al., "Light-Responsive Arylazopyrazole Gelators: From Organic to Aqueous Media and from Supramolecular to Dynamic Covalent Chemistry," Chem. Eur. J. 25:6131-6140 (2019).

Wang et al., "Supramolecular Hydrogels Constructed by Red-Light-Responsive Host-Guest Interactions for Photo-Controlled Protein Release in Deep Tissue," Soft Matter 11:7656-7662 (2015).

International Preliminary Report on Patentability for PCT/US2021/016381 (Jul. 28, 2022).

Fisher et al., "Azopyrazoles for Long-Term Thermal Energy Storage and Sub-Zero Optically Triggered Heat Release," Poster presented on Feb. 4, 2020.

Calbo et al., "Tuning Azoheteroarene Photoswitch Performance Through Heteroaryl Design," Journal of the American Chemical Society 139:1261-1274 (2017).

Gerkman et al., "Phase Transition of Spiropyrans: Impact of Isomerization Dynamics at High Temperatures," Chem. Commun. 55:5813-5816 (2019).

Gonzalez et al., "Solid-State Photoswitching Molecules: Structural Design for Isomerization in Condensed Phase," Materials Today Advances 6:100058 (2020).

Han et al., "Optically-Controlled Long-Term Storage and Release of Thermal Energy in Phase-Change Materials," Nature Communications 8(1):1446 (2017).

Han et al., "Optically-Regulated Thermal Energy Storage in Diverse Organic Phase-Change Materials," Chem. Commun. 54:10722 (2018).

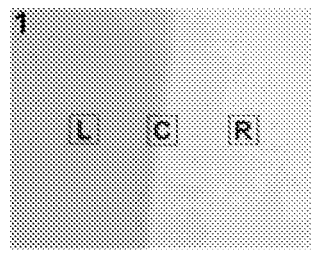
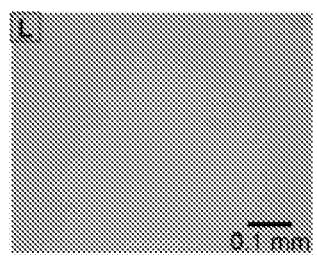
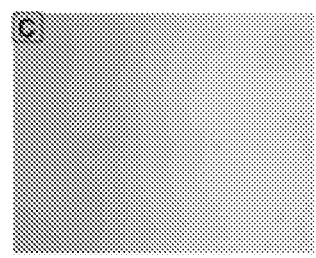
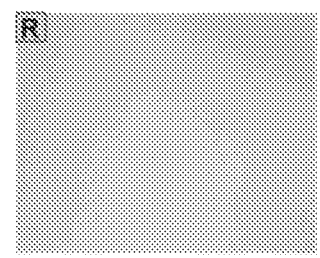
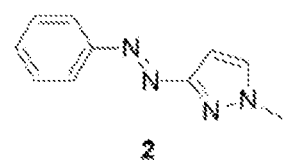
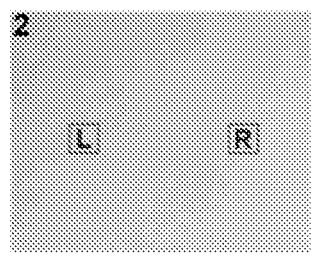
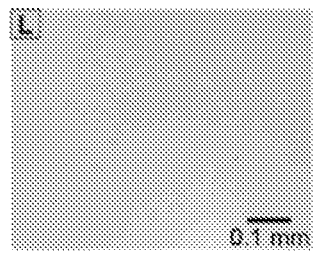
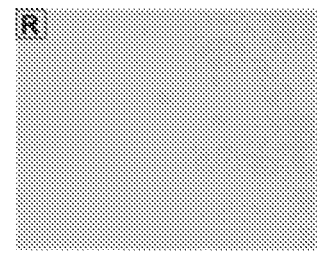
FIGS. 14A-14B

ARYLAZO-HETEROARYL COMPOUNDS AND THEIR USE FOR LONG-TERM THERMAL ENERGY STORAGE

This application is a national stage application under 35 U.S.C. § 371 of International Application No. PCT/US2021/016381, filed Feb. 3, 2021, which claims the priority benefit of U.S. Provisional Patent Application Ser. No. 62/969,634, filed Feb. 3, 2020, which are hereby incorporated by reference in their entirety.

FIELD OF THE INVENTION

The present invention relates to arylazo-heteroaryl compounds and their use for long-term thermal energy storage.

BACKGROUND OF THE INVENTION

Photo-switching molecular systems including azobenzenes (Fu et al., "Solar Thermal Storage and Room-Temperature Fast Release Using a Uniform Flexible Azobenzene-Grafted Polynorborene Film Enhanced by Stretching," *Macromolecules* 52:4222-4231 (2019); Wu et al., "Solar-Thermal Energy Conversion and Storage Using Photoresponsive Azobenzene-Containing Polymers," *Macromol. Rapid Commun.* 41:1900413 (2019); Zhitomirsky et al., "Solid-State Solar Thermal Fuels for Heat Release Applications," *Adv. Energy Mater.* 6:1502006 (2016)), norbornadienes (Lorenz et al., "Switchable Norbornadiene-Quadricyclane Interconversion Mediated by Covalently Bound C60," *Chem. Eur. J.* 26:5220-5230 (2020); Mansø et al., "Molecular Solar Thermal Energy Storage in Photoswitch Oligomers Increases Energy Densities and Storage Times," *Nat. Commun.* 9:1945 (2018); Schuschke et al., "Solar Energy Storage at an Atomically Defined Organic-Oxide Hybrid Interface," *Nat. Commun.* 10:2384 (2019); Wang et al., "Macroscopic Heat Release in a Molecular Solar Thermal Energy Storage System," *Energ. Environ. Sci.* 12:187-193 (2019)), dihydroazulenes (Broman et al., "Dihydroazulene: from Con-trolling Photochromism to Molecular Electronics Devices," *Phys. Chem. Chem. Phys.* 16:21172-21182 (2014); Cacciarini et al., "An Effective Trigger for Energy Release of Vinylheptafulvene-Based Solar Heat Batteries," *Chem. Commun.* 53:5874-5877 (2017); Wang et al., "Evaluating Dihydroazulene/Vinylheptafulvene Photoswitches for Solar Energy Storage Applications," *ChemSusChem* 10:3049-3055 (2017); Mogensen et al., "Molecular Solar Thermal Energy Storage Systems with Long Discharge Times Based on the Dihydroazulene/Vinylheptafulvene Couple," *Eur. J. Org. Chem.* 2019(10):1986-1993 (2019)), and fulvalenediruthenium complexes (Moth-Poulsen et al., "Molecular Solar Thermal (MOST) Energy Storage and Release System," *Energ. Environ. Sci.* 5:8534-8537 (2012); Börjesson et al., "Photon Upconversion Facilitated Molecular Solar Energy Storage," *J. Mater. Chem. A* 1:8521-8524 (2013); Lennartson et al., "Tuning the Photochemical Properties of the Fulvalene-Tetracarbonyl-Diruthenium System," *Dalton Trans.* 45:8740-8744 (2016)) have been recognized as molecular solar thermal (MOST) energy storage materials that convert photon energy to thermal energy by reversible isomerization and energy storage in a metastable isomeric state. Among those listed, azobenzene derivatives have been particularly well explored as MOST compounds due to a plethora of functionalization methods (Nguyen et al., "Advances in Direct Metal-Catalyzed Functionalization of Azobenzenes," *ACS Catal.* 8:1546-1579 (2018); Merino, E. "Synthesis of Azobenzenes: the Coloured Pieces of Molecular Materials," *Chem. Soc. Rev.* 40:3835-3853 (2011)) available and their remarkable E-Z isomerization cyclability (Dong et al., "Azobenzene-Based Solar Thermal Fuels: Design, Properties, and Applications," *Chem. Soc. Rev.* 47:7339-7368 (2018)). Various forms of MOST materials have been developed incorporating azobenzene groups, including small molecules (Hu et al., "Flexible Solar Thermal Fuel Devices: Composites of Fabric and a Photoliquefiable Azobenzene Derivative," *Adv. Energy Mater.* 9:1901363 (2019); Kunz et al., "Intermolecular London Dispersion Interactions of Azobenzene Switches for Tuning Molecular Solar Thermal Energy Storage Systems," *ChemPlusChem* 84:1145-1148 (2019)), oligomers (Zhitomirsky et al., "Conformal Electroplating of Azobenzene-Based Solar Thermal Fuels onto Large-Area and Fiber Geometries," *ACS Appl. Mater. Interfaces* 8:26319-26325 (2016); Zhou et al, "Photoswitching of Glass Transition Temperatures of Azobenzene-Containing Polymers Induces Reversible Solid-to-Liquid Transitions," *Nat. Chem.* 9:145-151 (2017)), polymers (Saydjari et al., "Spanning the Solar Spectrum: Azopolymer Solar Thermal Fuels for Simultaneous UV and Visible Light Storage," *Adv. Energy Mater.* 7:1601622 (2017); Jeong et al., "High Energy Density in Azobenzene-Based Materials for Photo-Thermal Batteries via Controlled Polymer Architecture and Polymer-Solvent Interactions," *Sci. Rep.* 7:17773 (2017)), carbon nanotubes (Kucharski "Templated Assembly of Photoswitches Significantly Increases the Energy-Storage Capacity of Solar Thermal Fuels," *Nat. Chem.* 6:441-447 (2014); Jiang et al., "Molecular Regulation of Nano-Structured Solid-State AZO-SWCNTs Assembly Film for the High-Energy and Short-Term Solar Thermal Storage," *Sol. Energy Mater. Sol. Cells* 193:198-205 (2019)), graphene oxides (Yang et al., "Efficient Cycling Utilization of Solar-Thermal Energy for Thermochromic Displays with Controllable Heat Output," *J. Mater. Chem. A* 7:97-106 (2019); Pang et al., "A High Energy Density Azobenzene/Graphene Oxide Hybrid with Weak Nonbonding Interactions for Solar Thermal Storage," *Sci. Rep.* 9:5224 (2019)), etc., and have demonstrated energy storage in the metastable Z isomer state upon UV irradiation. One challenge that azobenzene derivatives face as MOST storage materials is their short Z isomer half-life ($t_{1/2}$) ranging from seconds to days depending on azo-benzene functionalization (Olmsted et al., "Photochemical Storage Potential of Azobenzenes," *Sol. Energy* 30:271-274 (1983); Asano et al., "Thermal Z-E Isomerization of Azobenzenes. The Pressure, Solvent, and Substituent Effects," *J. Org. Chem.* 49:4387-4391 (1984)). The thermal stability of the Z isomer is determined by both steric and electronic effects on both the E Z ground states and isomerization transition state (Dong et al., "Azobenzene-Based Solar Thermal Fuels: Design, Properties, and Applications," *Chem. Soc. Rev.* 47:7339-7368 (2018); Bandara et al., "Photoisomerization in Different Classes of Azobenzene," *Chem. Soc. Rev.* 41:1809-1825 (2012)). Such thermal stability governs the thermal energy storage lifetime in MOST materials, and various molecular designs have been developed to increase thermal stability of azobenzene Z isomers.

One method to increase the half-life of azobenzenes is to replace one of the aryl rings with a pyrazole: the arylazopyrazoles (Weston et al., "Arylazopyrazoles: Azoheteroarene Photoswitches Offering Quantitative Isomerization and Long Thermal Half-Lives," *J Am. Chem. Soc.* 136:11878-11881 (2014); Calbo et al., "A Combinatorial Approach to Improving the Performance of Azoarene Photoswitches," *Beilstein J. Org. Chem.* 15:2753-2764 (2019); Calbo et al., "Tuning Azoheteroarene Photoswitch Performance through Heteroaryl Design," *J. Am. Chem. Soc.* 139:1261-1274 (2017); Gibson et al., "Chemical Z-E Isomer Switching of Arylazopyrazoles Using Acid," *ChemPhotoChem* 3:372-377 (2019); Zhang et al., "Pyrazolylazophenyl Ether-Based Photoswitches: Facile Synthesis, (Near-)Quantitative Photoconversion, Long Thermal Half-Life, Easy Functionalization, and Versatile Applications in Light-Responsive Systems," *Chem. Eur. J.* 25:13402-13410 (2019); Zhang et al., "Photo-Controlled Reversible Microtubule Assembly Mediated by Paclitaxel-Modified Cyclodextrin," *Angew. Chem., Int. Ed.* 57:8649-8653 (2018); Haydell et al., "Temporal and Reversible Control of a DNAzyme by Orthogonal Photoswitching," *J. Am. Chem. Soc.* 140:16868-16872 (2018); Stricker et al., L.; "Arylazopyrazoles as Light-Responsive Molecular Switches in Cyclodextrin-Based Supramolecular Systems," *J. Am. Chem. Soc.* 138:4547-4554 (2016); Schnurbus et al., "Smart Air-Water Interfaces with Arylazopyrazole Surfactants and Their Role in Photoresponsive Aqueous Foam," *Langmuir* 34: 6028-6035 (2018); Lamping et al., "Responsive Surface Adhesion based on Host-Guest Interaction of Polymer Brushes with Cyclodextrins and Arylazopyrazoles," *Polym. Chem.* 10:683-690 (2019)). While there are several factors that underpin the increased stability of the azopyrazoles, it is notable that these azo switches have exceptionally long thermal half-lives (days to years). In principle, the increased thermal stability of the Z isomer presents a potential for generating MOST materials with elongated total heat storage time and a wider range of temperatures at which heat can be stored.

In addition to addressing the stability of Z isomers, continuous effort has been made to increase the total heat storage density in MOST compounds, particularly azobenzenes that show low energy density (41 kJ/mol for pristine) (Corruccini et al., "The Heat of Combustion of cis- and trans-Azobenzene," *J. Am. Chem. Soc.* 61:2925-2927 (1939)). A prominent strategy harvests the latent heat of azobenzene derivatives as well as the Z-E isomerization energy by optically changing the phase of the molecules during the photo-isomerization process (i.e. solid E↔liquid Z)(Xu et al., "Photoinduced Reversible Solid-to-Liquid Transitions for Photoswitchable Materials," *Angew. Chem., Int. Ed.* 58:9712-9740 (2019); Ishiba et al., "Photoliquefiable Ionic Crystals: A Phase Crossover Approach for Photon Energy Storage Materials with Functional Multiplicity," *Angew. Chem., Int. Ed.* 54:1532-1536 (2015); Han et al., "Photon Energy Storage Materials with High Energy Densities based on Diacetylene-Azobenzene Derivatives," *J. Mater. Chem. A* 4:16157-16165 (2016); Kimizuka et al., "Photon Upconversion and Molecular Solar Energy Storage by Maximizing the Potential of Molecular Self-Assembly," *Langmuir* 32:12304-12322 (2016)). The azobenzene derivatives have also been used as a dopant in organic phase change materials to manipulate the solid-liquid phase transition of the composite by optical means (Han et al., "Optically-Regulated Thermal Energy Storage in Diverse Organic Phase-Change Materials," *Chem. Commun.* 54:10722-10725 (2018)). Despite the increased energy storage density in these materials, the heat storage time is still limited to hours due to the thermal reversion of the azobenzene derivatives, even at room temperature.

To maximize the usefulness of MOST materials, it is important to extend beyond the limited range of temperatures at which optically controlled heat release can occur currently. Most of the reported systems measure heat release at around room temperature, due to the facile Z-to-E reversion at high temperatures (above 60° C.) (Han et al., "Optically-Regulated Thermal Energy Storage in Diverse Organic Phase-Change Materials," *Chem. Commun.* 54:10722-10725 (2018)). Moreover, triggered heat release at low temperatures, especially below 0° C., remains a challenge, because the Z liquid phase crystallizes and uncontrollably loses latent heat storage (Zhao-Yang et al., "Efficient Co-Harvesting of Solar Energy and Low-Grade Heat by Molecular Photoswitches for High Energy Density, Long-Term Stable Solar Thermal Battery," *ChemRxiv* doi.org/10.26434/chemrxiv.9730694.v1 (2019)). According to a recent review on the melting points of mono- and di-substituted E and Z azobenzenes by Xu et al., "Photoinduced Reversible Solid-to-Liquid Transitions for Photoswitchable Materials," *Angew. Chem., Int. Ed.* 58:9712-9740 (2019)), most of the reported Z isomers show high crystallinity and melting points in the range of 20-200° C. (which implies the uncontrolled crystallization of Z isomer below room temperature).

It would be desirable, therefore, to identify azobenzene derivatives that possess an improved thermal stability of Z isomers at high temperatures, liquid-phase stability at temperatures below 0° C., and improved thermal energy density.

The present invention is directed to overcoming these and other deficiencies in the art.

SUMMARY OF THE INVENTION

A first aspect of the present application relates to a compound of Formula (I):

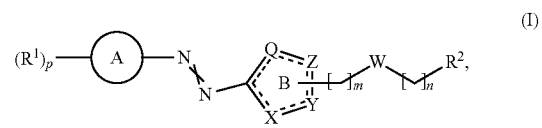

wherein
---- is a single or a double bond;

 is aryl or heteroaryl;

ring B is a heteroaryl ring selected from the group consisting of pyrazolyl, oxazolyl, isoxazolyl, thiazolyl, isothiazolyl, and imidazolyl;

Q is $C(R^3)$ or N;

X is N, C, or C(R');

Y is N, C, or C(R');

Z is N, N(R), O, S, or C(R');

each $R^1$ is independently selected at each occurrence thereof from the group consisting of H, halogen, unsaturated or saturated $C_{1-6}$ hydrocarbon, —CN, —$NO_2$, —$OR^4$, —$OC(O)R^4$, —$C(O)OR^4$, —$C(O)R^4$, —$NR^4R^5$ and —$C(O)NR^4R^5$, wherein unsaturated or saturated $C_{1-6}$ hydrocarbon can be optionally substituted 1 to 3 times with halogen;

$R^2$ is H or unsaturated or saturated $C_{1-6}$ hydrocarbon;

$R^3$ is H or unsaturated or saturated $C_{1-6}$ hydrocarbon;

$R^4$ is H or unsaturated or saturated $C_{1-50}$ hydrocarbon;

$R^5$ is H or unsaturated or saturated $C_{1-6}$ hydrocarbon;

W is selected from the group consisting of —$CH_2$—, —O—, —C(O)O—, C(O)S—, and —C(O)NH—;

R is H or $C_{1-6}$ alkyl;

R' is H or $C_{1-6}$ alkyl;

m is 1 or more, preferably 1 to 20;

n is 2 or more, preferably 2 to 20; and p is 0, 1, 2, 3, 4, or 5, preferably 0 to 2.

A second aspect of the present application relates to a composition comprising one or more compounds of Formula (I) according to the first aspect of the application.

A third aspect of the present application relates to a process for preparation of a compound of Formula (I) according to the first aspect of the application.

In one embodiment, this process includes the steps of: providing a compound of Formula (II):

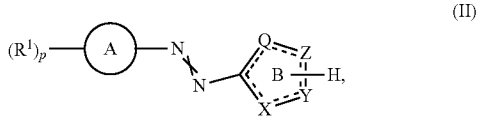

(II)

and
forming the compound of Formula (I) from the compound of Formula (II).

In another embodiment, this process includes the steps of: providing a compound of Formula (X):

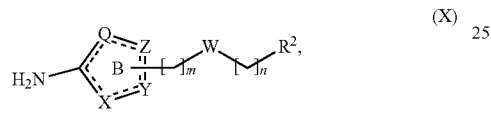

(X)

and
forming the compound of Formula (I) from the compound of Formula (X).

A fourth aspect of the present application relates to a use of one or more compounds of Formula (I) according to the first aspect of the application, or a composition according to the second aspect of the application as a thermal-storage material.

A fifth aspect of the present application relates to a thermal-storage device that includes one or more compounds of Formula (I) according to the first aspect of the application, or a composition according to the second aspect of the application, where the one or more compounds or the composition is retained on a substrate.

A sixth aspect of the present application relates to a method of storing energy. This method includes the steps of: providing an energy storage device comprising one or more compounds according to the first aspect of the application, or a composition according to the second aspect of the application, whereby the one or compounds of Formula I is present as an E-isomer; activating the compounds of Formula (I) to produce a Z-isomer of the one or more compounds according to Formula I; and storing the Z-isomer of the one or more compounds of Formula I for a period of time. Following storage, the Z-isomer can be induced to revert to the E-isomer, resulting in the exothermic release of the stored energy. The heat can be used for various end purposes (e.g., warming a particular environment, another component, or an individual).

Molecular design strategies for azo MOST materials are described and demonstrated in the present application. Arylazopyrazole derivatives based on four core structures (4pzMe, 3pzH, 4pzH, and 4pzH-F2) and functionalized with an ester-linked hydrocarbon (e.g., dodecanoate) group were demonstrated to store thermal energy in their metastable Z isomer liquid phase and release the energy by optically triggered crystallization at −30° C. Three heat storage-release schemes were discovered involving different activation methods (optical, thermal, or combined) for generating liquid-state Z isomers capable of storing thermal energy. Visible light irradiation induced the selective crystallization of the liquid phase via Z-to-E isomerization, and the latent heat stored in the liquid Z isomers was preserved for longer than two weeks unless optically triggered. Up to 92 kJ/mol of thermal energy was stored in the compounds demonstrating remarkable thermal stability of Z isomers at high temperatures and liquid-phase stability at temperatures below 0° C. The heat release at such low temperatures has significant implications for a number of different thermal storage utilities, including defrosting of engine oils and mechanical parts, as well as personal heating under extreme cold conditions where other traditional heat generation, such as combustion, is limited.

The arylazopyrazoles are stable over repeated cycling. There is no loss in photoswitchability of molecules for 20 cycles of operation. Generally azoarene switches are known to be photostable for hundreds of cycles of reversible switching. The molecules are also thermally stable within the operation window of temperatures. Unless the molecules are heated above 200 C, they do not undergo decomposition.

BRIEF DESCRIPTION OF THE DRAWINGS

FIGS. 14A-14F show optical images demonstrating light-induced crystallization in thin films of compounds 1, 2, 4, 2', 3', and 4', respectively. The photo to the right of the chemical structure represents the entire 2.5×2.5 cm film. Optical microscope images were taken of the Z-isomer-rich left side of the film (L), the E-isomer-rich right side of the film (R), and the interface between the two areas (C). The left side (L) of the film was covered by a mask to preserve Z isomers in the stable liquid phase, and the right side (R) was selectively irradiated by an LED.

DETAILED DESCRIPTION OF THE INVENTION

Figure 1:
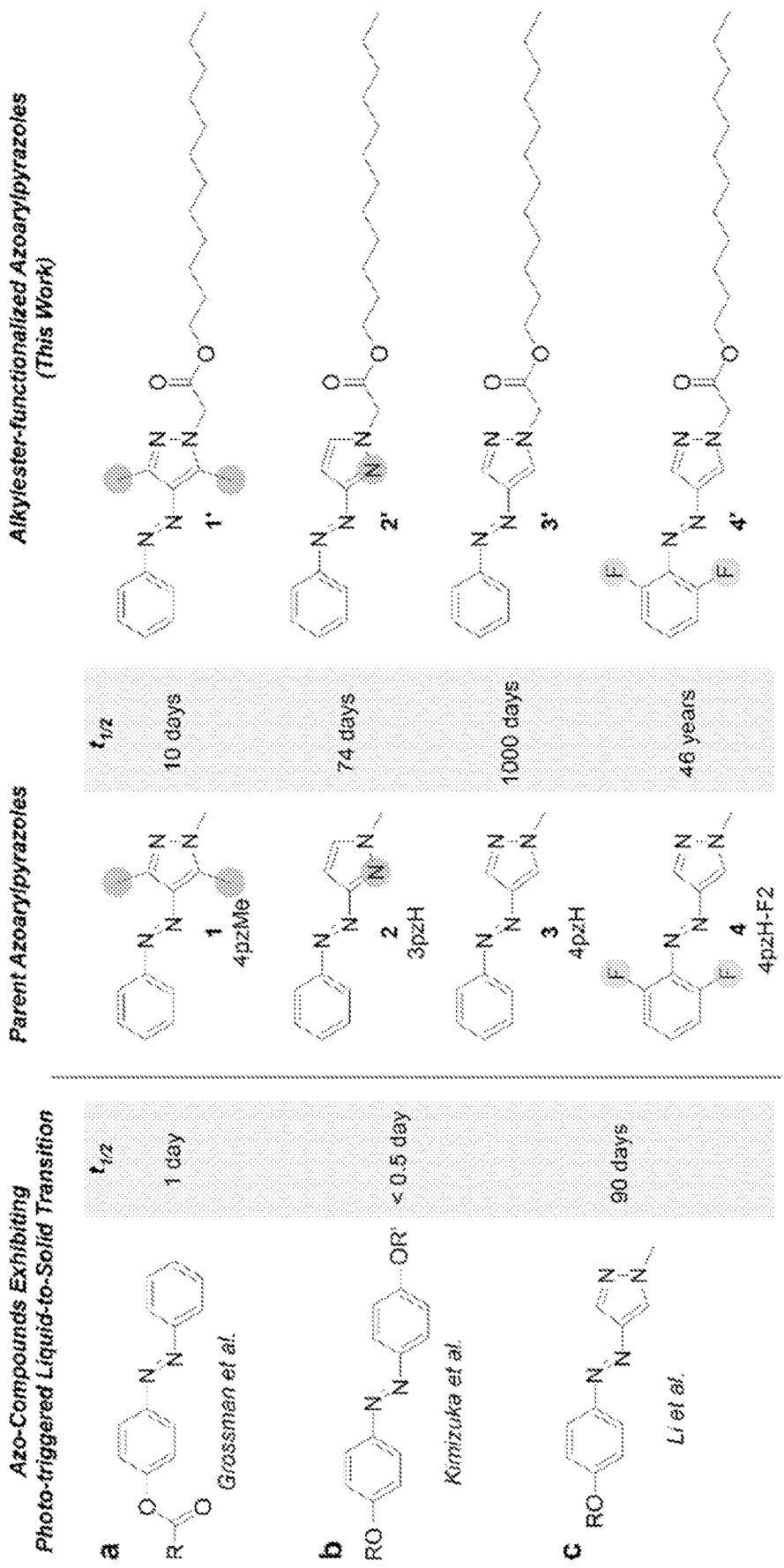
FIG. 1 shows previous azo-derivatives (azobenzene, a; arylazopyrazole, b; and arylazoisoxazole, c) that have shown photo-triggered crystallization and heat release. R (or R') represents a linear alkyl (Han et al., "Optically-Controlled Long-Term Storage and Release of Thermal Energy in Phase-Change Materials," $Nat.$ $Commun.$ 8:1446 (2017), which is hereby incorporated by reference in is entirety), linear alkyl and oligoether-based ammonium group (Kimizuka et al., "Spontaneous Self-assembly of Glycolipid Bilayer Membranes in Sugar-philic Ionic Liquids and Formation of Ionogels," $Langmuir$ 17:6759-6761 (2001), which is hereby incorporated by reference in its entirety), and linear alkyl/terminal alkenyl (Zhang et al., "Photochemical Phase Transitions Enable Coharvesting of Photon Energy and Ambient Heat for Energetic Molecular Solar Thermal Batteries That Upgrade Thermal Energy," $J.$ $Am.$ $Chem.$ $Soc.$ 142:12256-12264 (2020), which is hereby incorporated by reference in its entirety). Compounds 1'-4' are novel derivatives of previously synthesized parent azopyrazoles 1-4, functionalized with a dodecanoate group. Thermal Z isomer half-lives ($t_{1/2}$) of previous compounds are given in solution at room temperature, except for an azobenzene derivative, which was measured as a solid. Grey circles show the structural modification relative to pristine 4pzH (3).

The present invention relates to novel compounds that are suitable for use as an active component of a thermal storage medium.

One aspect of the present application relates to a compound of Formula (I):

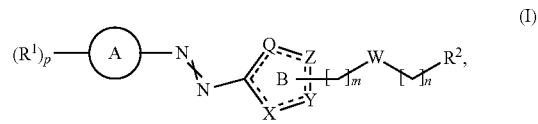

wherein

---- is a single or a double bond;

 is aryl or heteroaryl;

ring B is a heteroaryl ring selected from the group consisting of pyrazolyl, oxazolyl, isoxazolyl, thiazolyl, isothiazolyl, and imidazolyl;

Q is C($R^3$) or N;

X is N, C, or C(R');

Y is N, C, or C(R');

Z is N, N(R), O, S, or C(R');

each $R^1$ is independently selected at each occurrence thereof from the group consisting of H, halogen, unsaturated or saturated $C_{1-6}$ hydrocarbon, —CN, —$NO_2$, —$OR^4$, —OC(O)$R^4$, —C(O)O$R^4$, —C(O)$R^4$, —N$R^4R^5$ and —C(O)N$R^4R^5$, wherein unsaturated or saturated $C_{1-6}$ hydrocarbon can be optionally substituted 1 to 3 times with halogen;

$R^2$ is H or unsaturated or saturated $C_{1-6}$ hydrocarbon;

$R^3$ is H or unsaturated or saturated $C_{1-6}$ hydrocarbon;

$R^4$ is H or unsaturated or saturated $C_{1-50}$ hydrocarbon;

$R^5$ is H or unsaturated or saturated $C_{1-6}$ hydrocarbon;

W is selected from the group consisting of —$CH_2$—, —O—, —C(O)O—, —C(O)S—, and —C(O)NH—;

R is H or $C_{1-6}$ alkyl;

R' is H or $C_{1-6}$ alkyl;

m is 1 or more, preferably 1 to 20;

n is 2 or more, preferably 2 to 20; and p is 0, 1, 2, 3, 4, or 5, preferably 0 to 2. Where p is 1 or greater, the $R^1$ groups can be located in various positions on the (A) ring relative to the azo group, i.e., ortho, meta, or para positions.

As used above, and throughout the description herein, the following terms, unless otherwise indicated, shall be understood to have the following meanings. If not defined otherwise herein, all technical and scientific terms used herein have the same meaning as is commonly understood by one of ordinary skill in the art to which this technology belongs. In the event that there is a plurality of definitions for a term herein, those in this section prevail unless stated otherwise.

The term "alkyl", "hydrocarbon", "saturated hydrocarbon" means an aliphatic hydrocarbon group which may be straight or branched having a recited number of carbon atoms in the chain. Branched means that one or more lower alkyl groups such as methyl, ethyl or propyl are attached to a linear alkyl chain. Exemplary alkyl groups include, without limitation, methyl, ethyl, n-propyl, i-propyl, n-butyl, t-butyl, n-pentyl, and 3-pentyl.

The term "unsaturated hydrocarbon" means alkenyl or alkynyl.

The term "alkenyl" means an aliphatic hydrocarbon group containing a carbon carbon double bond and which may be straight or branched having a recited number of carbon atoms (at least two) in the chain. Branched means that one or more lower alkyl groups such as methyl, ethyl, or propyl are attached to a linear alkenyl chain. Exemplary alkenyl groups include, without limitation, ethenyl, propenyl, n-butenyl, and i-butenyl.

The term "alkynyl" means an aliphatic hydrocarbon group containing a carbon carbon triple bond and which may be straight or branched having a recited number of carbon atoms (at least two) in the chain. Branched means that one or more lower alkyl groups such as methyl, ethyl, or propyl are attached to a linear alkynyl chain. Exemplary alkynyl groups include, without limitation, ethynyl, propynyl, n-butynyl, 2-butynyl, 3-methylbutynyl, and n-pentynyl.

The term "aryl" means an aromatic monocyclic or multicyclic ring system of 6 to about 14 carbon atoms, preferably of 6 to about 10 carbon atoms. Representative aryl groups include phenyl and naphthyl.

The term "heteroaryl" means an aromatic monocyclic or multicyclic ring system of about 5 to about 14 ring atoms, preferably about 5 to about 10 ring atoms, in which one or more of the atoms in the ring system is/are element(s) other than carbon, for example, nitrogen, oxygen, or sulfur. In the case of multicyclic ring system, only one of the rings needs to be aromatic for the ring system to be defined as "heteroaryl," Preferred heteroaryls contain about 5 to 6 ring atoms. The prefix aza, oxa, thia, or thio before heteroaryl means that at least a nitrogen, oxygen, or sulfur atom, respectively, is present as a ring atom. A nitrogen atom of a heteroaryl is optionally oxidized to the corresponding N-oxide. Representative heteroaryls include pyridyl, 2-oxopyridinyl, pyrimidinyl, pyridazinyl, pyrazinyl, triazinyl, furanyl, pyrrolyl, thiophenyl, pyrazolyl, imidazolyl, oxazolyl, isoxazolyl, thiazolyl, isothiazolyl, triazolyl, oxadiazolyl, thiadiazolyl, tetrazolyl, indolyl, isoindolyl, benzofuranyl, benzothiophenyl, indolinyl, 2-oxoindolinyl, dihydrobenzofuranyl, dihydrobenzothiophenyl, indazolyl, benzimidazolyl, benzooxazolyl, benzothiazolyl, benzoisoxazolyl, benzoisothiazolyl, benzotriazolyl, benzo[1,3]dioxolyl, quinolinyl, isoquinolinyl, quinazolinyl, cinnolinyl, pthalazinyl, quinoxalinyl, 2,3-dihydro-benzo[1,4]dioxinyl, benzo[1,2,3]triazinyl, benzo[1,2,4]triazinyl, 4H-chromenyl, indolizinyl, quinolizinyl, 6aH-thieno[2,3-d]imidazolyl, 1H-pyrrolo[2,3-b]pyridinyl, imidazo[1,2-a]pyridinyl, pyrazolo[1,5-a]pyridinyl, [1,2,4]triazolo[4,3-a]pyridinyl, [1,2,4]triazolo[1,5-a]pyridinyl, thieno[2,3-b]furanyl, thieno[2,3-b]pyridinyl, thieno[3,2-b]pyridinyl, furo[2,3-b]pyridinyl, furo[3,2-b]pyridinyl, thieno[3,2-d]pyrimidinyl, furo[3,2-d]pyrimidinyl, thieno[2,3-b]pyrazinyl, imidazo[1,2-a]pyrazinyl, 5,6,7,8-tetrahydroimidazo[1,2-a]pyrazinyl, 6,7-dihydro-4H-pyrazolo[5,1-c][1,4]oxazinyl, 2-oxo-2,3-dihydrobenzo[d]oxazolyl, 3,3-dimethyl-2-oxoindolinyl, 2-oxo-2,3-dihydro-1H-pyrrolo[2,3-b]pyridinyl, benzo[c][1,2,5]oxadiazolyl, benzo[c][1,2,5]thiadiazolyl, 3,4-dihydro-2H-benzo[b][1,4]oxazinyl, 5,6,7,8-tetrahydro-[1,2,4]triazolo[4,3-a]pyrazinyl, [1,2,4]triazolo[4,3-a]pyrazinyl, 3-oxo-[1,2,4]triazolo[4,3-a]pyridin-2(3H)-yl, and the like.

The term "monocyclic" used herein indicates a molecular structure having one ring.

The term "polycyclic" or "multicyclic" used herein indicates a molecular structure having two or more rings, including, but not limited to, fused, bridged, or spiro rings.

The term "halogen" means fluoro, chloro, bromo, or iodo.

The term "substituted" or "substitution" of an atom means that one or more hydrogen on the designated atom is replaced with a selection from the indicated group, provided that the designated atom's normal valency is not exceeded.

"Unsubstituted" atoms bear all of the hydrogen atoms dictated by their valency. When a substituent is keto (i.e., =O), then two hydrogens on the atom are replaced. Combinations of substituents and/or variables are permissible only if such combinations result in stable compounds; by "stable compound" or "stable structure" is meant a compound that is sufficiently robust to survive isolation to a useful degree of purity from a reaction mixture.

In one embodiment, (A) is selected from the group consisting of phenyl, naphthyl, imidazolyl, oxazolyl, isoxazolyl, thiazolyl, and isothiazolyl.

In another embodiment, the B-ring is selected from the group consisting of pyrazolyl, oxazolyl, isoxazolyl, thiazolyl, isothiazolyl, and imidazolyl.

In another embodiment, the compound of Formula (I) has the structure of Formula (Ia):

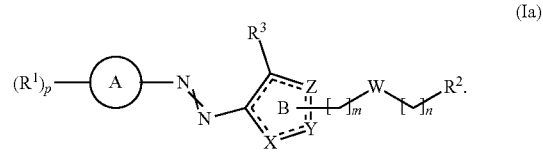

(Ia)

In yet another embodiment, the compound of Formula (I) has the structure of Formula (Ib):

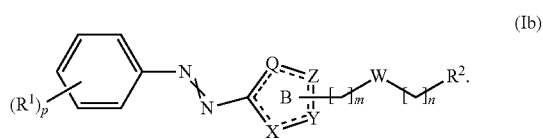

(Ib)

In a further embodiment, in the compounds of formulae (I), (Ia), and (Ib), n is 6 to 20, 6 to 18, 6 to 16, or 6 to 14.

In a further embodiment, in the compounds of formulae (I), (Ia), and (Ib), p is 0, 1, or 2.

Exemplary compounds of Formula (I), (Ia), and/or (Ib) include:

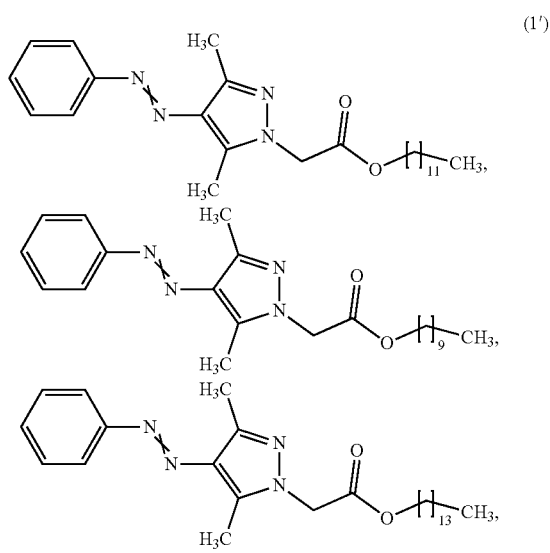

(1')

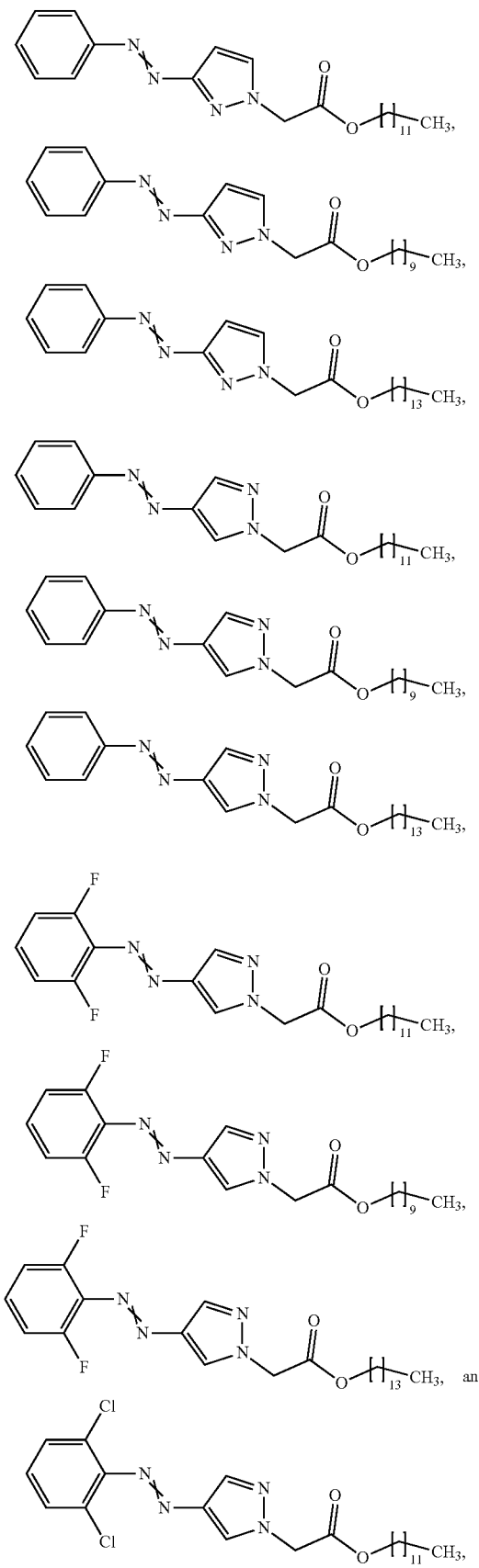

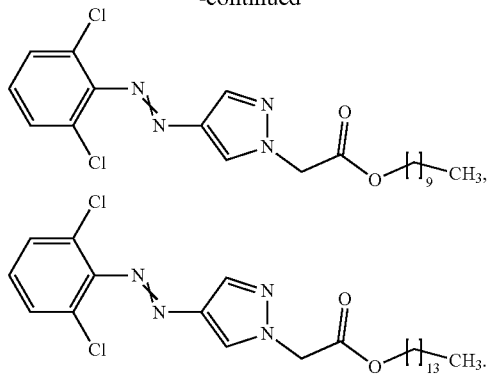

In one embodiment, the compound of Formulae (I), (Ia), or (Ib) is in the form of a Z-isomer. In this form, the compound is essentially in a stable, liquid form at temperatures from about −45° C. to about +85° C., and can be cooled below 0° C. without losing latent heat.

In another embodiment, the compound of Formulae (I), (Ia), or (Ib) is in the form of an E-isomer. In this form, the compound is essentially in a crystalline form.

In yet another embodiment, the compound of Formulae (I), (Ia), or (Ib) is in the form of a mixture of Z-isomer and E-isomer. Mixtures of the Z-isomer and E-isomer can vary from a Z:E ratio of about 1:99 to about 99:1, including from about 1:90 to about 90:1, from about 1:80 to about 80:1, from about 1:70 to about 70:1, from about 1:60 to about 60:1, from about 1:50 to about 50:1, from about 1:40 to about 40:1, from about 1:30 to about 30:1, from about 1:20 to about 20:1, from about 1:10 to about 10:1, and from about 1:5 to about 5:1.

The compounds are according to Formula (I), (Ia), and (Ib) can be prepared according to several processes, which are described below with reference to FIGS. 2-5 and illustrated in the accompanying examples.

In one embodiment, this process includes the steps of: providing a compound of Formula (II):

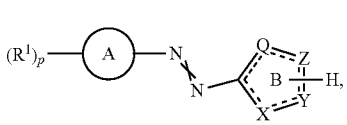

and
forming the compound of Formula (I) from the compound of Formula (II).

In one embodiment, forming the compound of Formula (I) is carried out by reacting the compound of Formula (II) with a compound of Formula (III)

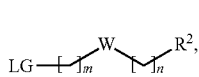

under conditions effective to produce the compound of Formula (I), wherein in the compound of Formula (III) LG is a suitable leaving group.

Suitable leaving groups that can be used according to the present application include, tosylate, mesylate, or halogen. In one embodiment, the suitable leaving group is halogen.

Figure 2:
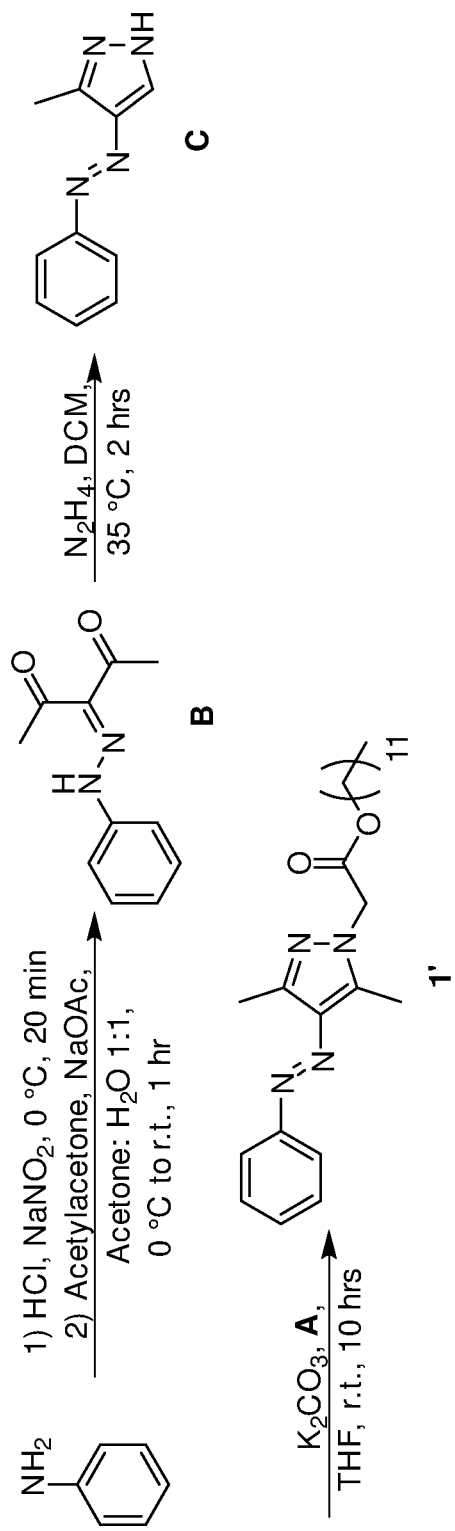
FIG. 2 is a scheme for the synthesis of compound 1'.

One example of this step is illustrated in FIG. 2, with respect to making compound 1', where dodecyl-2-bromoacetate (A) and (E)-3,5-dimethyl-4-(phenyldiazenyl)-1H-pyrazole (C) are reacted to form Dodecyl (E)-2-(3,5-Dimethyl-4-(phenyldiazenyl)-1H-pyrazol-1-yl)acetate.

Additional steps in this process include:
providing a compound of Formula (IV):

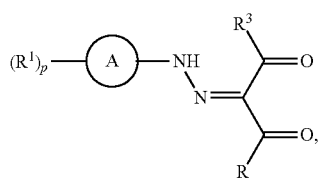

(IV)

and
forming the compound of Formula (II) from the compound of Formula (IV).

In another embodiment, forming the compound of Formula (II) comprises reacting the compound of Formula (IV) with $N_2H_4$, or a salt or hydrate thereof, under conditions effective to produce the compound of Formula (II).

One example of this step is illustrated in FIG. 2, with respect to making compound 1', where 3-(2-phenylhydrazineylidene)pentane-2,4-dione (B) and hydrazine are reacted to form (E)-3,5-dimethyl-4-(phenyldiazenyl)-1H-pyrazole (C).

Additional steps in this process include:
providing a compound of Formula (VI):

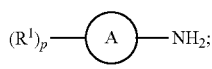

(VI)

providing a compound of Formula (VII):
and

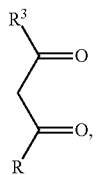

(VII)

reacting the compound of Formula (VI) with the compound of Formula (VII) under conditions effective to produce the compound of Formula (IV).

One example of this step is illustrated in FIG. 2, with respect to making compound 1', where analine and acetylacetone are reacted to form 3-(2-Phenylhydrazineylidene)pentane-2,4-dione (B).

In an alternative embodiment, the process includes the steps of:
providing a compound of Formula (VIII):

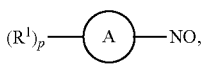

(VIII)

providing a compound of Formula (IX):

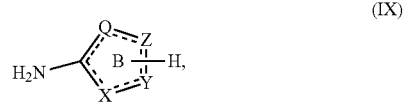

(IX)

and
reacting the compound of Formula (VIII) with the compound of Formula (IX) under conditions effective to produce the compound of Formula (II).

Figure 4:
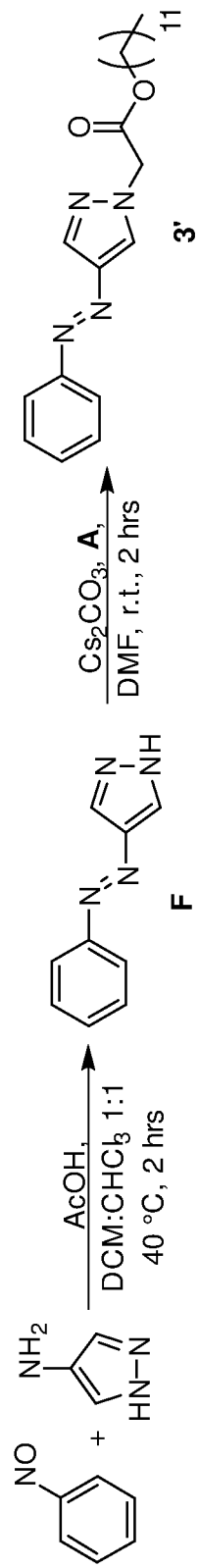
FIG. 4 is a scheme for the synthesis of compound 3'.

One example of this step is illustrated in FIG. 4, with respect to making compound 3', where 4-amino-1H-pyrazole and nitrosobenzene were reacted to form (E)-4-(Phenyldiazenyl)-1H-pyrazole (F).

Figure 5:
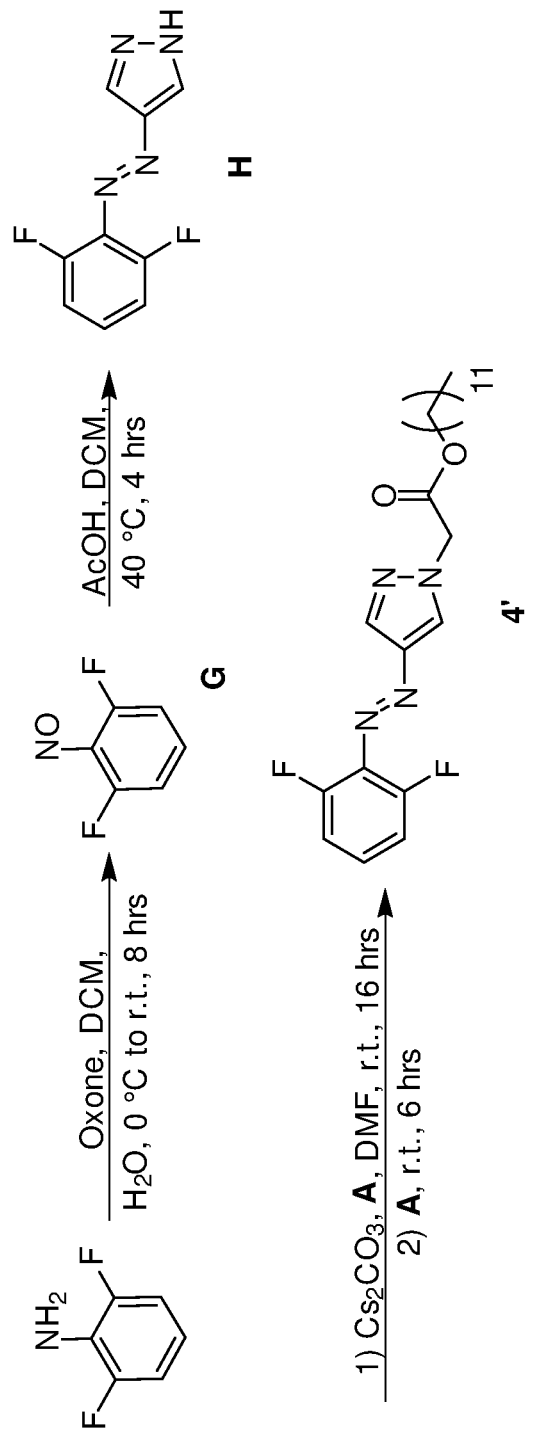
FIG. 5 is a scheme for the synthesis of compound 4'.
Figure 6A:
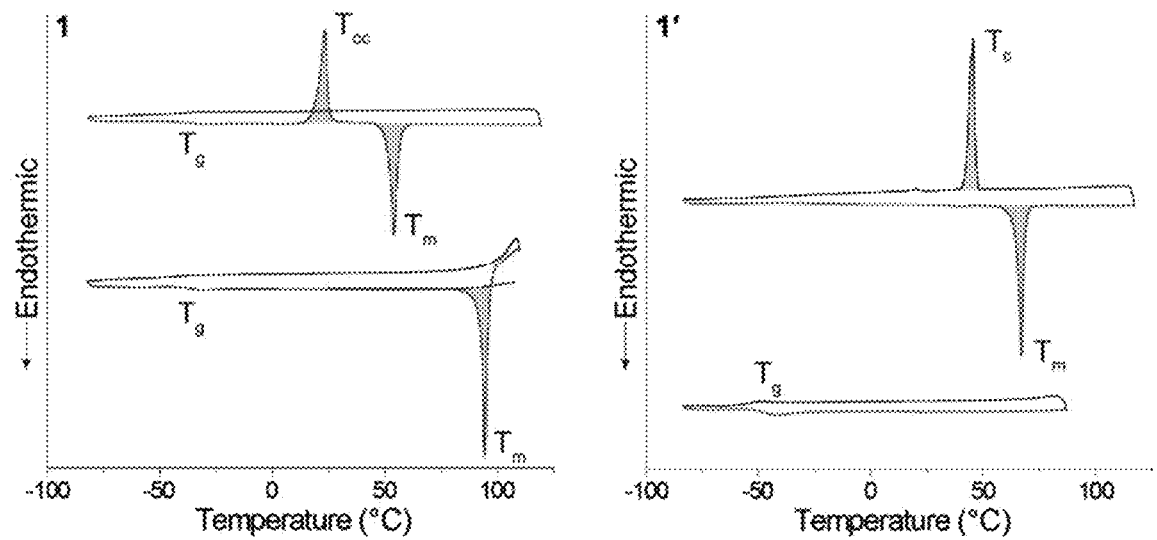
FIGS. 6A-6D shows DSC plots illustrating thermal properties of E (top curve) and Z (bottom curve) isomers upon heating and cooling for compounds 1 and 1' (6A), 2 and 2' (6B), 3 and 3' (6C), and 4 and 4' (6D). The following features are highlighted: crystallization temperature ($T_c$), cold-crystallization temperature ($T_{cc}$), melting temperature ($T_m$), and glass transition ($T_g$). Scan rate is 10° C./min. Due to changes observed during repeated heating/cooling cycles, for compounds 1, 2, and 2', distinct initial melting curves for the Z isomers are shown.
Figure 6B:
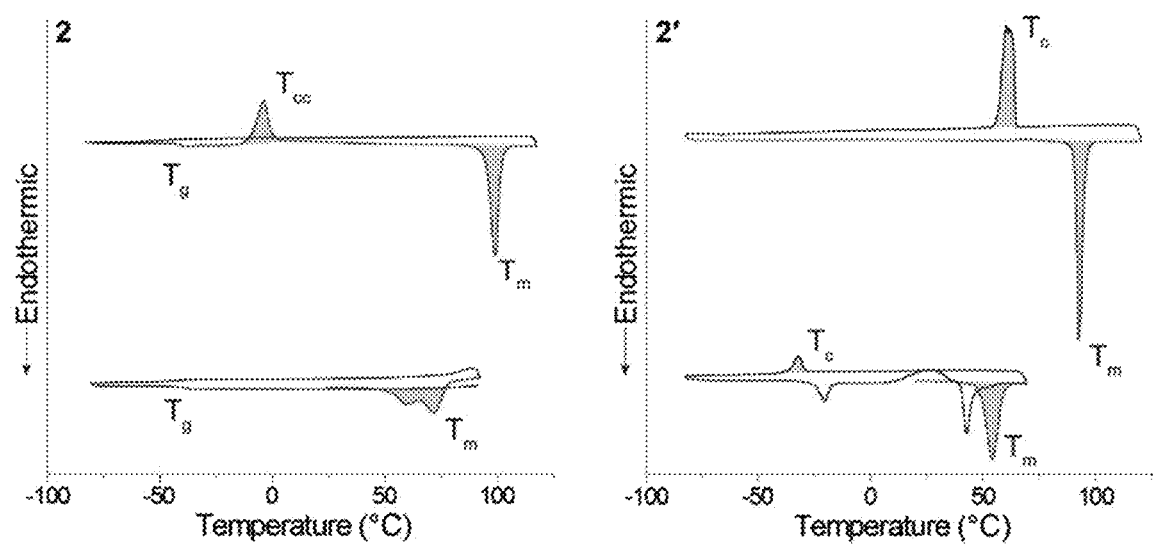
Figure 6C:
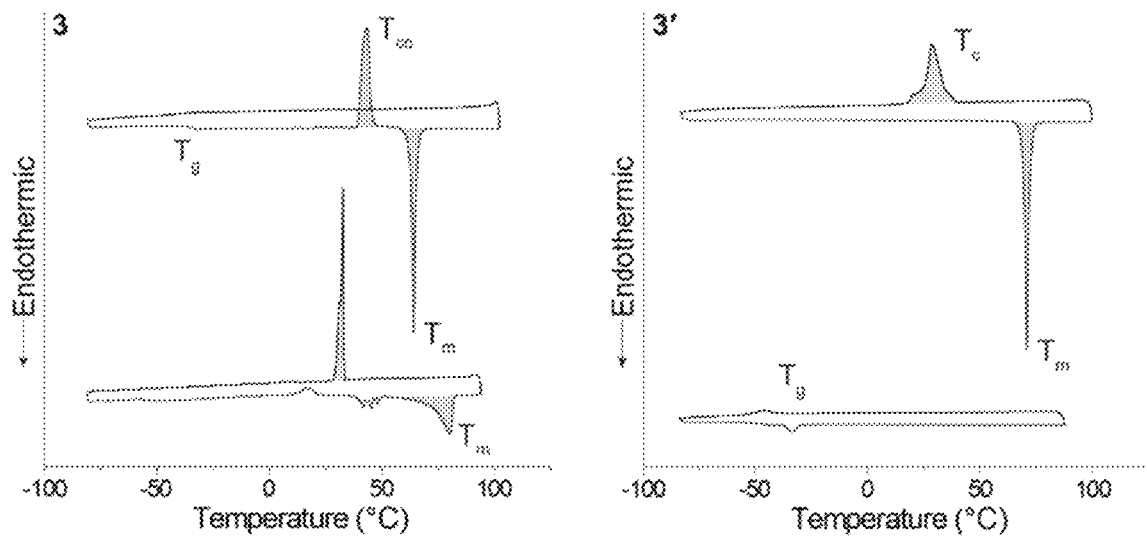
Figure 6D:
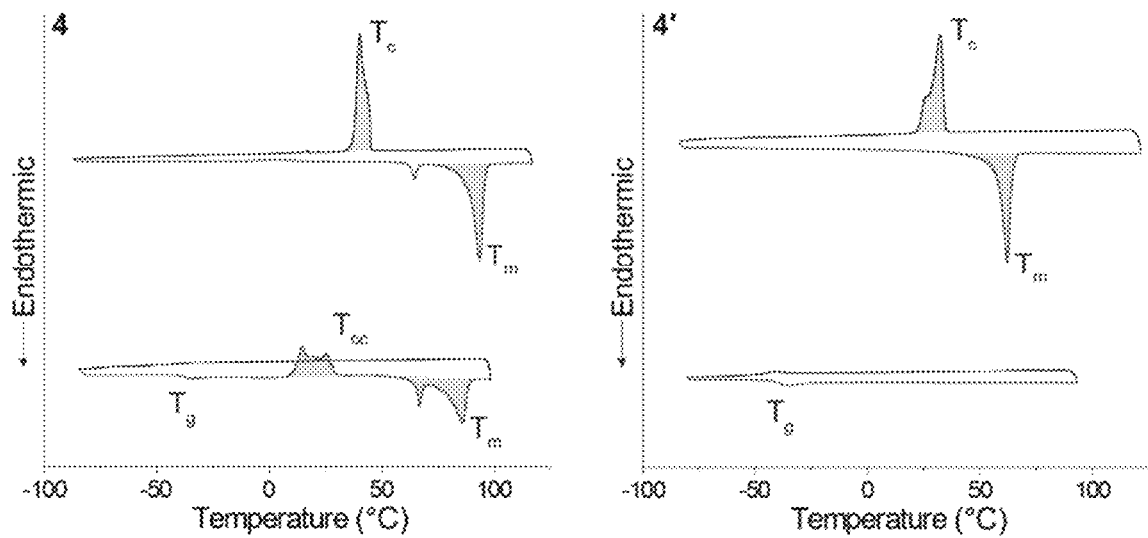

Another example of this step is illustrated in FIG. 5, with respect to making compound 4', where 4-amino-1H-pyrazole and 2,6-difluoronitrosobenzene (G) were reacted to form (E)-4-((2,6-Difluorophenyl)diazenyl)-1H-pyrazole (H).

Additional steps in this process include:
providing a compound of Formula (VI):

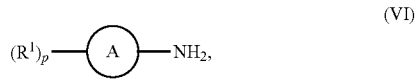

(VI)

and
reacting the compound of Formula (VI) with oxone under conditions effective to produce the compound of Formula (VIII).

One example of this step is illustrated in FIG. 5, with respect to making compound 4', where 2,6-difluoroanaline and oxone were reacted to form 2,6-difluoronitrosobenzene (G).

In yet another embodiment, the process for forming the compounds of formula (I), (Ia), or (Ib) includes the steps of:
providing a compound of Formula (X):

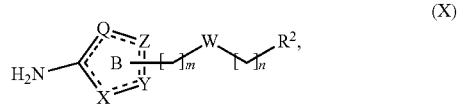

(X)

and
forming the compound of Formula (I) from the compound of Formula (X).

In one embodiment, forming the compound of Formula (I) is carried out by reacting the compound of Formula (X) with a compound of Formula (VIII):

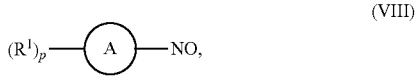

(VIII)

under conditions effective to produce the compound of Formula (I).

Figure 3:
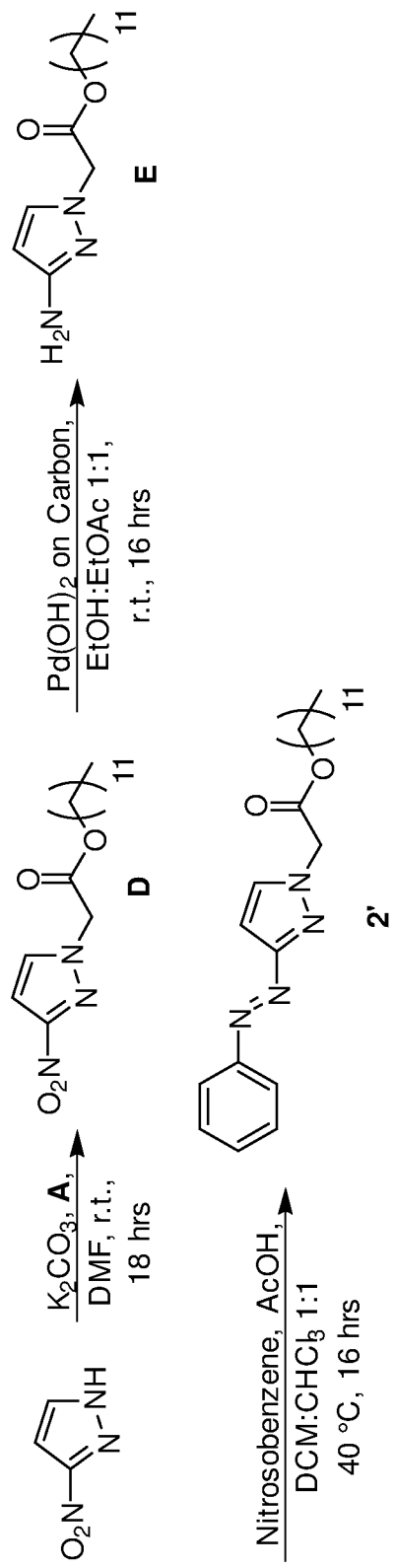
FIG. 3 is a scheme for the synthesis of compound 2'.

One example of this step is illustrated in FIG. 3, with respect to making compound 2', where dodecyl 2-(3-amino- 1H-pyrazol-1-yl)acetate (E) is reacted with nitrosobenzene to form dodecyl (E)-2-(3-(Phenyldiazenyl)-1H-pyrazol-1-yl)acetate.

Additional steps in this process include:
providing a compound of Formula (XI):

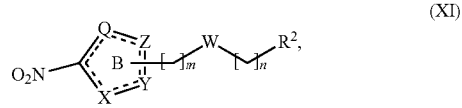

(XI)

and
forming the compound of Formula (X) from the compound of Formula (XI). According to one approach, forming the compound of Formula (X) involves reacting the compound of Formula (XI) with a reducing agent under conditions effective to produce the compound of Formula (X).

One example of this step is illustrated in FIG. 3, with respect to making compound 2', where dodecyl 2-(3-nitro-1H-pyrazol-1-yl)acetate (D) was reacted with nitrogen/palladium hydroxide to form dodecyl 2-(3-amino-1H-pyrazol-1-yl)acetate (E).

Additional steps in this process include:
providing a compound of Formula (XII):

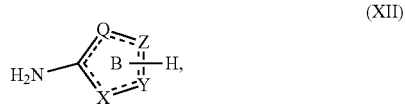

(XII)

providing a compound of Formula (III):

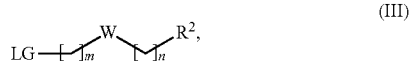

(III)

wherein LG is a suitable leaving group; and
reacting the compound of Formula (XII) with the compound of Formula (III) under conditions effective to produce the compound of Formula (XI).

One example of this step is illustrated in FIG. 3, with respect to making compound 2', where dodecyl 2-bromoacetate (A) is reacted with 3-nitro-1H-pyrazole to form dodecyl 2-(3-nitro-1H-pyrazol-1-yl)acetate (D).

The compounds according to Formula (I), (Ia), and (Ib) can be synthesized using the procedures described above, as well as the procedures described in Otsuki et al., "Photoisomerization and Thermal Isomerization of Arylazoimidazoles," *J. Phys. Chem. A* 111(8):1403-1409 (2007); Kumar et al., "Arylazo-3,5-dimethylisoxazoles: Azoheteroarene Photoswitches Exhibiting High Z-Isomer Stability, Solid-State Photochromism, and Reversible Light-Induced Phase Transition," *Chem. Eur. J.,* 25:1924-11932 (2019), Crespi et al., "Heteroaryl Azo Dyes as Molecular Photoswitches," *Nature Reviews Chemistry* 3:133-146 (2019); Banghart et al., "Photochromic Blockers of Voltage-Gated Potassium Channels," *Angew. Chem., Int. Ed.* 48(48):9097-9101 (2009); Crivillers et al., "Large Work Function Shift of Gold Induced by a Novel Perfluorinated Azobenzene-Based Self-Assembled Monolayer," *Adv. Materials* 25(3):432-436 (2013); Dalton et al., "Syntheses of Some Thiol Esters for Acylation of Proteins," *Australian Journal of Chemistry* 34(4):759-764 (1981); Dgbrowa et al., "Anion-Tunable Control of Thermal Z→E Isomerisation in Basic Azobenzene Receptors," *Chem. Commun.* 50:15748-15751 (2014); Kato et al., "Optical Detection of Anions Using N-(4-(4-Nitrophenylazo)phenyl)-N'-propyl Thiourea Bound Silica Film," *New J. Chem.* 37:717-721 (2013); Tian et al., "Azobenzene-Benzoylphenylureas as Photoswitchable Chitin Synthesis Inhibitors," *Org. Biomol. Chem.* 15:3320-3323 (2017); Li et al., "Smart Azobenzene-Containing Tubular Polymersomes: Fabrication and Multiple Morphological Tuning," *Chem. Commun.* 56:6237-6240 (2020); Huang et al., "Synthesis and Z-Scan Measurements of Third-Order Optical Nonlinearity of Azothiazole- and Azobenzothiazole-Containing Side-Chain Polymers," *Polym. Bull.* 73:1545-1552 (2016); $ener et al., "Azocalixarenes. 3: Synthesis and Investigation of the Absorption Spectra of Hetarylazo Disperse Dyes Derived From Calix[4]arene," *Dyes and Pigments* 62(2):141-148 (2004); Anderson et al., "Benzenediazonium Ions: Structure, Complexation, and Reactivity," *J. Chem. Soc., Perkin Trans.* 2 9:1239-1241 (1987); Lin et al., "Properties and Applications of Designable and Photo/Redox Dual Responsive Surfactants With the New Head Group 2-Arylazo-imidazolium," *RSC Adv.* 6:51552-51561 (2016); Calbo et al., "Tuning Azoheteroarene Photoswitch Performance Through Heteroaryl Design," *J. Am. Chem. Soc.* 139:1261-1274 (2017); Zhou et al., "A Novel Azopyridine-Based Ru(II) Complex with GSH-responsive DNA photobinding ability," *Chem. Commun.* 51:10684-10686 (2015); Otsuki et al., "Photoisomerization and Thermal Isomerization of Arylazoimidazoles," *J. Phys. Chem. A* 111:1403-1409 (2007); Cechovi et al., "Photoswitching Behavior of 5-Phenylazopyrimidines: In Situ Irradiation NMR and Optical Spectroscopy Combined With Theoretical Methods," *J. Org. Chem.* 83:5986-5998 (2018); Garcia-Amorós et al., "Light-Controlled Real Time Information Transmitting Systems Based on Nanosecond Thermally-Isomerising Amino-Azopyridinium Salts," *Chem. Commun.* 48:3421-3423 (2012); Coelho et al., "Enhancement of the Photochromic Switching Speed of Bithiophene Azo Dyes," *Tetrahedron Lett.* 53:4502-4506 (2012); Simeth et al., "Tuning the Thermal Isomerization of Phenylazoindole Photoswitches From Days to Nanoseconds," *J. Am. Chem. Soc.* 140:2940-2946 (2018); Bandara et al., "Photoisomerization in Different Classes of Azobenzene," *Chem. Soc. Rev.* 41:1809-1825 (2012); Brown et al., "Cis-Trans Isomerism in the Pyridyl Analogs of Azobenzene. Kinetic and Molecular Orbital Analysis," *J. Am. Chem. Soc.* 97:621-627 (1975); Nakagawa et al., "Photochromic, Electrochemical, and Photoelectrochemical Properties of Novel Azopyridinium Derivatives," *Bull. Chem. Soc. Jpn.* 70:737-744 (1997); Travieso-Puente et al., "Arylazoindazole Photoswitches: Facile Synthesis and Functionalization via SNAr Substitution," *J. Am. Chem. Soc.* 139:3328-3331 (2017); Rennhack et al., "Photocontrol of the Hvl Proton Channel," *ACS Chem. Biol.* 12:2952-2957 (2017); Telleria et al., "Azobenzene-Appended Bis-Cyclometalated Iridium(III) Bipyridyl Complexes," *Organometallics* 34:5513-5529 (2015); Thies et al., "Light-Driven Coordination-Induced Spin-State Switching: Rational Design of Photodissociable Ligands," *Chem. Eur. J.* 18:16358-16368 (2012); Ferreira et al., "Design, Synthesis and Inhibitory Activity of Photoswitchable RET Kinase Inhibitors," *Sci. Rep.* 5:9769 (2015); Mondal et al., "Photoisomerization Dynamics of N-1-Methyl-2-(tolylazo) Imidazole and the Effect of Complexation with Cu(II)," *Phys. Chem. Chem. Phys.* 14:13027-13034 (2012); Bull et al., "Isomerisation of an Intramolecular Hydrogen-Bonded Photoswitch: Protonated Azobis(2-imidazole)," *Phys. Chem.*

*Chem. Phys.* 19:12776-12783 (2017); Kolarski et al., "Two-Step, One-Pot Synthesis of Visible-Light-Responsive 6-Azopurines," *Org. Lett.* 19:5090-5093 (2017); Garcia-Amorös et al., "New Heterocyclic Systems to Afford Microsecond Green-Light Isomerisable Azo Dyes and Their Use as Fast Molecular Photochromic Switches," *Chem. Commun.* 49:11427-11429 (2013), each of which is hereby incorporated by reference in its entirety For example, arylazoisoxazole compounds of Formula I can be prepared as described in the scheme below:

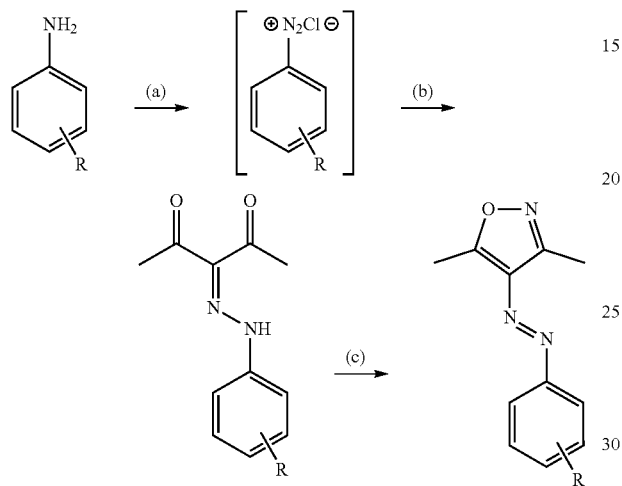

where (a) NaNO$_2$, HCl, H$_2$O, 0-58C; (b) acetylacetone, NaOAc; (c) NH$_2$OH HCl, Na$_2$CO$_3$, EtOH, reflux.

Compounds of Formula I can also be prepared as described in the scheme below:

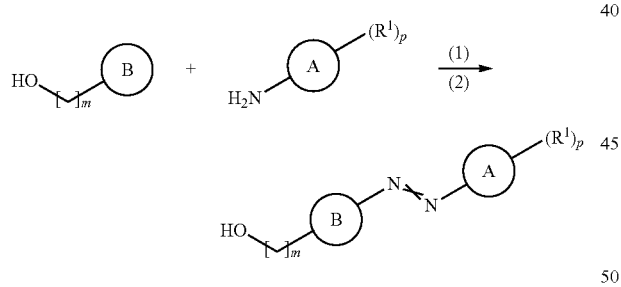

where (1) NaNO$_2$, HCl and (2) NaOH; or (1) NaNO$_2$, H$_2$SO$_4$ and (2) Na$_2$CO$_3$, using the procedures described in Li et al., "Smart Azobenzene-Containing Tubular Polymersomes: Fabrication and Multiple Morphological Tuning," *Chem. Commun.* 56:6237-6240 (2020); Huang et al., "Synthesis and Z-Scan Measurements of Third-Order Optical Nonlinearity of Azothiazole- and Azobenzothiazole-Containing Side-Chain Polymers," *Polym. Bull.* 73:1545-1552 (2016); çener et al., "Azocalixarenes. 3: Synthesis and Investigation of the Absorption Spectra of Hetarylazo Disperse Dyes Derived From Calix[4]arene," *Dyes and Pigments* 62(2):141-148 (2004), each of which is hereby incorporated by reference in its entirety.

Compounds of Formula I can also be prepared as described in the schemes below:

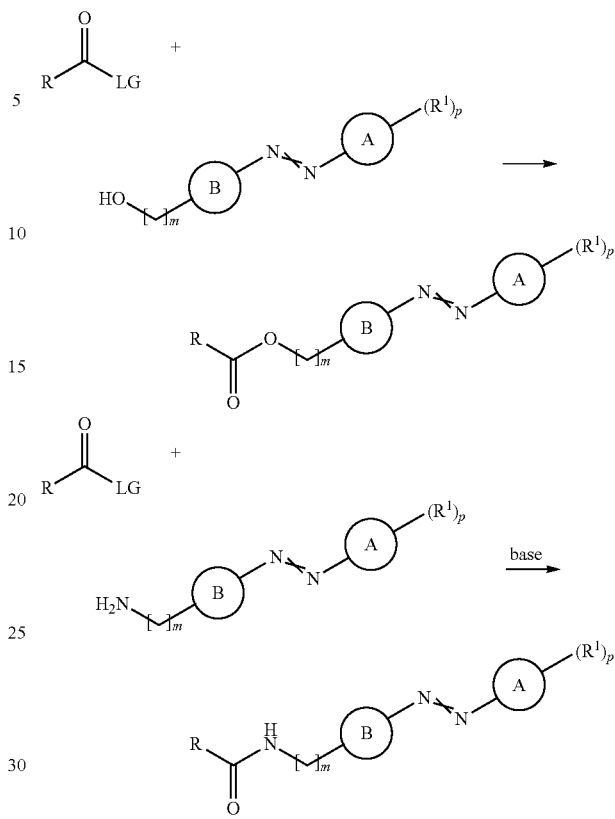

where LG is a suitable leaving group, such as Cl, Br, or Bt; base is a suitable base, such as Et$_3$N, EtN(Pr-i)$_2$, piperidine, morfoline, or the like (Banghart et al., "Photochromic Blockers of Voltage-Gated Potassium Channels," *Angew. Chem., Int. Ed.* 48(48):9097-9101 (2009), which is hereby incorporated by reference in its entirety).

Compounds of Formula I can also be prepared as described in the scheme below:

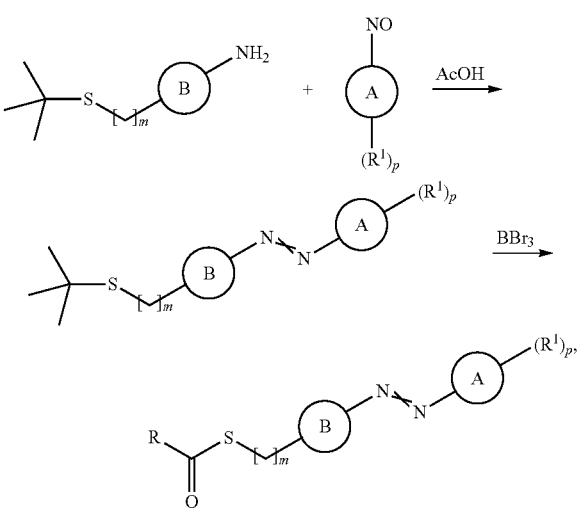

using the procedures described in Crivillers et al., "Large Work Function Shift of Gold Induced by a Novel Perfluorinated Azobenzene-Based Self-Assembled Monolayer,"

Adv. Materials 25(3):432-436 (2013), which is hereby incorporated by reference in its entirety.

Compounds of Formula I can also be prepared as described in the scheme below:

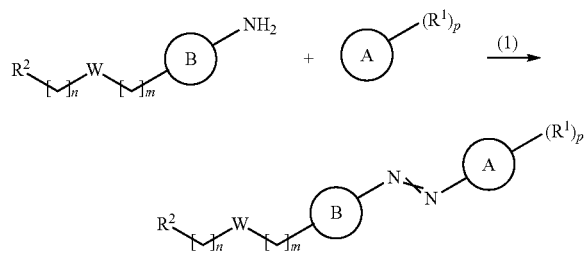

where (1) NaNO$_2$, H$_2$SO$_4$, using the procedures described in Saylam et al., "Azo-8-hydroxyquinoline dyes: The Synthesis, Characterizations and Determination of Tautomeric Properties of Some New Phenyl and Heteroarylazo-8-hydroxyquinolines," *Journal of Molecular Liquids* 195:267-276 (2014); Seferoğlu et al., "Synthesis and Crystal Structures of Two Hetarylazo Indole Disperse Dyes," *Structural Chemistry* 19:559-564 (2008), each of which is hereby incorporated by reference in its entirety.

Compounds of Formula I (wherein W is O) can also be prepared as described in the scheme below:

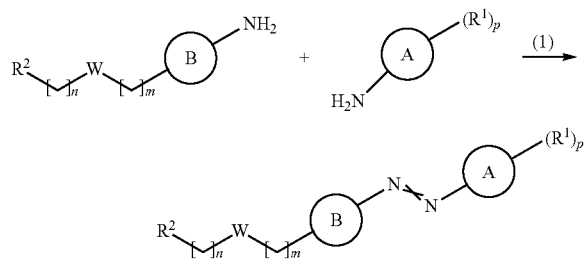

where (1) NaNO$_2$, HCl, H$_2$O, using the procedures described in European Patent Application No. 2868703 to Barbieru et al., which is hereby incorporated by reference in its entirety.

Compounds of Formula I (wherein ring B is imidazolyl) can also be prepared as described in PCT Application No. WO 2018053027 to Murphy et. al., which is hereby incorporated by reference in its entirety.

Compounds of Formula I can also be prepared as described in the scheme below:

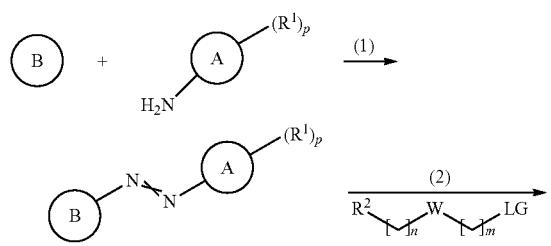

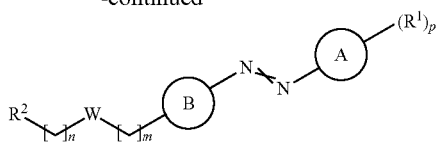

where (1) NaNO$_2$, HCl; (2) K$_2$CO$_3$; and LG is a suitable leaving group, such as Cl, Br, or SO$_3$Me; using the procedures described in PCT Application No. WO 2016146813 to Bachmann et al., which is hereby incorporated by reference in its entirety.

Another aspect of the present application relates to a composition that includes one or more compounds of Formula (I) according to the first aspect of the application.

In one embodiment, the composition consists of a single compound of Formula (I), (Ia), or (Ib) in a substantially pure form, such as at least about 95% pure, at least about 97% pure, at least about 98% pure, or at least about 99% pure. This is without regard to the (E)/(Z) form of the compound.

In another embodiment, the composition contains two or more compounds of Formula (I), (Ia), or (Ib), with or without additional diluents. This is without regard to the (E)/(Z) form of the compound.

In a further embodiment, the composition further contains one or more compounds of Formula (I), (Ia), or (Ib), with or without additional diluents.

Suitable diluents include, without limitation, organic solvents as well as organic phase-change materials (PCM) in which the compounds are dispersed while in the liquid state.

Phase-change materials (PCM) for use in the present application include alkanes (aliphatic hydrocarbons), fatty acids, fatty alcohols, fatty acid esters, paraffin waxes, polyethylene glycols, sugar alcohols, salts of fatty acid, and combinations thereof. They can have an origin derived from animal fat, animal grease, vegetable oil, vegetable wax, synthetic compounds and/or combinations of two or more thereof. Due to phenomena described by freezing point depression theory, mixtures generally tend to release latent heat over a larger temperature range than pure components. Whereas pure components are often referred to as having a melting point temperature, mixtures typically have a melting point temperature range.

In certain embodiments, the organic phase-change material comprises one or more of aliphatic hydrocarbons, fatty acids, fatty alcohols, or combinations thereof.

The aliphatic hydrocarbons, fatty acid, and fatty alcohol phase change materials can have a C8 to C30 hydrocarbon chain, preferably those having a C10 to C30 hydrocarbon chain. The hydrocarbon chain can be saturated or unsaturated, although it is preferably saturated. In one embodiment, the composition includes a fatty acid or fatty alcohol as the phase change material.

Suitable fatty acids include those occurring naturally in triglycerides as well as synthetic fatty acids. Fatty acids can be obtained from the hydrolysis of triglycerides, as is well known in the art. Exemplary fatty acids for use in the preset application include, but are not limited to oleic acid, palmitic acid, linoleic acid, palmitoleic acid, stearic acid, tridecanoic acid, pentadecanoic acid, heptadecanoic acid, nonadecanoic acid, caprylic acid, capric acid, and lauric acid as well as combinations of two or more thereof. Frequently available fatty acids can be hydrates and hydrogenated acids of any of the preceding acids.

The fatty acid esters can be formed with alcohols, diols, and/or polyols, including, but not limited to, mono-, di- or triglycerides of glycerol, esters of pentaerythritol, polyesters of polyhydric alcohols, esters of methanol, ethanol, propanol, butanol, isobutanol, pentanol, hexanol, cyclohexanol, esters or diesters of ethylene glycol and/or combinations of two or more thereof. The fatty acid esters can be mono-, di- or triglycerides of glycerol, and/or combinations thereof. Additionally, the fatty acid esters can be ester of higher fatty acids with higher monohydric alcohols.

Esters of fatty acids can be formed by a variety of methods known in the art including transesterification or hydrolysis followed by esterification. The advantage of this approach is that relatively pure components having targeted melting point temperatures can be synthesized.

For example, a multitude of esters of oleic acid can be formed by complete esterification with methanol, ethanol, propanol, butanol, isobutanol, pentanol, hexanol, cyclohexanol, phenol, ethylene glycol, glycerin, diethylene glycol, and many more. To a first approximation, the oleate esters formed with each of these esters will result in different melting point temperatures. Furthermore, mixtures of two of the esters have the potential to form mixtures having relatively narrow and useful melting point temperature ranges.

Exemplary fatty alcohols for use as PCMs include, but are not limited to, dodecanol (lauryl alcohol), tetradecanol (myristyl alcohol), hexadecanol (cetyl alcohol), and octadecanol (stearyl alcohol).

In another embodiment, the phase change material is a long chain alkanes or alkene with minimal branching, or no branching; of these, long chain alkanes with minimal branching are preferred. These hydrocarbons are able to solidify at temperatures above 0° C., and can absorb heat and melt. Alkanes ranging in carbon length from C14 to C30 may be particularly useful in the present application. Exemplary alkane PCMs of the present application include, but are not limited to long chain aliphatic such as tetradecane, pentadecane, hexadecane, heptadecane, octadecane, nonadecane, icosane, henicosane, docosane, tricosane, tetracosane, pentacosane, hexacosane, heptacosane, octacosane, nonacosane, icosane, and triacontane.

Additionally, natural and synthetic polymers may be use for phase change materials in the present application. Exemplary polymers include, but are not limited to polyethylene glycol, polypropylene glycol, polytetramethylene glycol, Poly(N-isopropyl acrylamide), Poly(diethyl acrylamide), Poly(tert-butylacrylate), Poly(isopropyl methacrylamide), Hydroxypropyl cellulose, Hydroxymethyl cellulose, Poly (oxazoline), and Poly(organophosphazenes).

A sugar alcohol (also known as a polyol, polyhydric alcohol, or polyalcohol) is a hydrogenated form of a saccharide, whose carbonyl group (aldehyde or ketone, reducing sugar) has been reduced to a primary or secondary hydroxyl group. They are commonly used for replacing sucrose in foodstuffs, often in combination with high intensity artificial sweeteners to counter the low sweetness. Exemplary sugar alcohols that may be used in the present application as PCMs include, but are not limited to, xylitol, pentaerythritol, trimethylolethane, erythritol, mannitol, neopentyl glycol and mixtures thereof.

Further examples of diluent phase change materials that can may be used in the present application are disclosed in U.S. Pat. No. 6,574,971 to Suppes; and U.S. Pat. No. 8,308,861 to Rolland et al.; U.S. Pat. No. 7,645,803 to Tamarkin et al.; and U.S. Patent Application Publication No. 2019/0092992 to Rajagopalan et al., all of which are hereby incorporated by reference in their entirety.

The optional organic phase-change material can be present, if desired, in an amount of about 10 to about 90 weight percent (based on the total weight of the composition). For example, the organic phase-change material can be present in the composition in an amount of about 15 to about 80 weight percent, about 20 to about 80 mol percent, about 25 to about 80 mol percent, about 30 to about 70 weight percent, about 35 to about 65 mol percent, about 40 to about 60 weight percent, or about 45 to about 55 mol percent. Alternatively, the organic phase-change material can be present in the composition in an amount of about 15 to about 85 weight percent, about 15 to about 70 weight percent, about 15 to about 65 mol percent, about 15 to about 60 weight percent, about 15 to about 55 mol percent, about 15 to about 50 weight percent, about 15 to about 45 mol percent, about 15 to about 40 weight percent, or about 15 to about 35 mol percent.

In certain embodiments, the composition further comprises a polymer solution or film in which the compounds of Formula (I), (Ia), or (Ib) are dispersed.

In one embodiment, the polymer solution or film is a polyolefin, a polyacrylate, a polystyrene, a polymethyl methacrylate, a polyester, a polyamide, a polyurethane, a polypropylene, a polyethylene (including polytetrafluoroethylenes and polychlorotrifluoroethylenes), or a combination of two or more such polymers, i.e., a (co)polymer film. Such films can be used as functional coatings or functional fabrics. Polymer based molecular solar thermal system (MOST) can be realized by compounding into existing polymer matrices of the types described above. Further substituents, like carbazole or benzophenones may be attached to the polymer to facilitate the photoisomerization process.

The compounds and compositions as described herein can be used to form various composite structures and thermal storage devices. The composite structures may form subcomponents of thermal storage devices.

In one aspect, the invention relates to a composite structure that includes a porous structural component and either a compound or a composition as described herein.

Exemplary porous structural components include, without limitation, an aerogel, a xerogel, a nanotube, metal organic framework, covalent organic framework, zeolite, graphene, graphene oxide, graphite, transition metal dichalcogenide, or hexagonal boron nitride.

Thermal storage devices/systems that include a compound or composition as described herein can take any of a variety of configurations.

In accordance with one embodiment, a thermal-storage device may include a compound or composition as described herein, where the compound or composition is retained on a substrate. The substrate may optionally include a thermal conducting element to facilitate heat transfer from the compound or composition to another article or the ambient environment during exothermic phase change, as discussed herein. Alternatively, the substrate itself may be thermally conductive, in which case a separate thermal conducting element may not be necessary, although it may be desirable to increase surface area for heat exchange.

The thermal-storage device may optionally include a light source, as well as accompanying circuitry controls, to allow the light source to illuminate the disclosed compound or compositions, and thereby induce an isomeric phase-change for the compounds.

One example of a thermal storage device is a device that is configured to facilitate heat transfer to engine oil or to stored water in accordance with the embodiments described and/or illustrated in PCT Application Publ. No. WO 2020/227227, which is hereby incorporated by reference in its entirety.

In one embodiment, the thermal-storage device may take the form of a solar energy collector, which may optionally include a wavelength converter or an energy converter. Non-limiting examples of energy storage devices, including solar energy storage devices, are described in International Application Publication Nos. WO 2019/106029 A1 and WO 2016/097199 A1; U.S. Application Publication No. 20180355234 A1; Moth-Poulsen et al., "Molecular Solar Thermal (MOST) Energy Storage and Release System," *Energy Environ. Sci.* 5:8534-8537 (2012); and Kashyap et al., "Full Spectrum Solar Thermal Energy Harvesting and Storage by a Molecular and Phase-Change Hybrid Material," *Joule* 3(12):3100-3111 (2019), each of which is hereby incorporated by reference in its entirety.

Based on the foregoing, the compounds and compositions as described herein can be used in a method of storing energy. This method can be carried implemented using an energy storage device as described herein. The method includes the following steps:
  i) providing an energy storage device comprising one or more compounds according to Formula (I), or a composition comprising one or more compounds of Formula (I) whereby the one or compounds of Formula (I) is present as an E-isomer;
  ii) activating the compounds of Formula (I) to produce a Z-isomer of the one or more compounds according to Formula I; and
  iii) storing the Z-isomer of the one or more compounds of Formula I for a period of time.

By including one or more compounds of Formula (I) there is a possibility to use a wider range of wavelengths when irradiating the system. Activating can involve heat and/or photon absorption, such as by using UV irradiation. Depending on the compound(s) included in the system, the optimal wavelength of the irradiation can be determined and then utilized. Regardless of the manner of activation, the step involves solid-to-liquid phase change of the compound or composition of the invention.

In step iii), the period of storage may be cyclical, such as on a daily cycle where the storage period may be several hours (e.g., up to 12 or 18 hours), but it may be desirable to extend the period of storage such that it is acyclical (e.g., for as long as a user desires). As indicated in the examples, several of the compounds can store energy for long periods of time over several days, several weeks, and even over several months. According to the present application, storing can be carried out for a period of time exceeding 12 hours. For example, storing is carried out for a period of time exceeding 24 hours, 36 hours, 48 hours, or 72 hours. Alternatively, storing can be carried out for a period of time from about 1 day up to about 21 days, about 2 days up to about 18 days, about 2 days up to about 14 days, about 3 days up to about 14 days, about 3 days up to about 10 days, or about 3 days up to about 7 days.

Having stored the energy for later use, the method also includes the step of:
  iv) inducing the Z-isomer of the one or more compounds of Formula I to isomerize back to E-isomer state, thereby releasing energy stored during said activating.

The energy released when one or more compounds of Formula I isomerize back to E-isomer state (step iv) is collected and/or transferred, if desired. The heat can be transferred, e.g., to ambient environment, water or other fluids (such as engine oil), and structural components in contact with the compound, composition, or heat exchanging component of a thermal storage system. The inducing step of step iv) can be an optically triggered crystallization.

In certain embodiments, the optically triggered crystallization can occur below room temperature. For example, the optically triggered crystallization occurs below 0° C., below −5° C., below −10° C., below −15° C., below −20° C., below −25° C., below −30° C., below −35° C., or even below −40° C.

In certain embodiment, the induced energy release by the compounds of Formula I is at least 50 kJ/mol or 55 kJ/mol, preferably at least 60 kJ/mol, 65 kJ/mol, 70 kJ/mol, 75 kJ/mol, 80 kJ/mol, 85 kJ/mol, or 90 kJ/mol. Induced energy release in the range of 75-95 kJ/mol is demonstrated in the examples.

Based on the foregoing, it should be apparent that it is contemplated that the method can be carried out repeatedly, with multiple cycles of the activating, storing, and inducing steps.

The compounds as defined in Formula I have shown the surprising combination of properties when used to carry out this method. For example, it is possible to control (i) the absorption spectrum of the compound of Formula I in E-isomer state; (ii) the energy storage half-life of the compound of Formula I in Z-isomer state; and/or (iii) the energy release profile of the compound of Formula I even under conditions below 0° C. (such as below −10° C., below −20° C., and even below −30° C.). Based on these combinations of unique properties, the storage devices of the invention make it possible to store energy for at least 14 days, whilst simultaneously having an absorption spectrum where the wavelength of absorption onset is of at least 300 nm.

More specifically, preferred methods of storing energy include using the compounds according to Formula I, as herein defined, to control (i) the absorption spectrum of the compound of Formula I, such that the compound of Formula I in E-isomer state exhibits wavelength absorption having an onset of at least 300 nm, with a preferred absorption onset wavelength of at least 350 nm, with a more preferred absorption onset wavelength of at least about 400 nm; (ii) the energy storage half-life of the one or more compounds of Formula I in Z-isomer state has an energy storage half-life of at least 14 days, with a preferred energy storage half-life of at least 50 days, with a much preferred energy storage half-life of at least 100 days, with a very much preferred energy storage half-life of at least 500 days; and (iii) the compounds of Formula I exhibiting release of at least 50 kJ/mol or 55 kJ/mol, preferably at least 60 kJ/mol, 65 kJ/mol, 70 kJ/mol, 75 kJ/mol, 80 kJ/mol, 85 kJ/mol, or 90 kJ/mol where heat release is inducible at temperatures as low as 0° C., −10° C., −20° C., and even −30° C.

Due to the activity of the compounds of formula (I), they have a ground state (OFF state) that is a crystalline solid. Due to exposure to light of appropriate wavelength or high temperature, the compounds of formula (I) are rendered molten, and irradiation (using light of appropriate wavelength) changes the switch to a metastable state (ON state) and "locks" the liquid phase. The step of irradiation can be carried out for a period of time sufficient to lock the liquid phase in the metastable state; typically this is from several minutes to several hours depending on the compound, the light source, and the intensity of the light. The stabilized liquid phase can then be stored for a desired period of time and allowed to cool to ambient temperature, and it can be moved (e.g., via pump) from one location (where it was activated to the ON state) to another location, such as a reservoir or a location where release and heat recovery occurs. For the release, irradiation induces crystallization by changing the switch back to its ground state (i.e., turning off the switch).

In certain limited exceptions, irradiation of the optically-inducible heat storage composition to "lock" the liquid phase in the metastable state can omitted, because the photo-switching component inherently causes the optically-inducible heat storage composition to adopt the metastable state once it is sufficiently heated.

In addition to the foregoing utilities described above, organic photoswitches that undergo reversible changes upon light irradiation have been integrated into various materials for applications, including light-driven actuation, drug delivery, sensing, and optical memory (Han et al., "Optically-controlled Long-term Storage and Release of Thermal Energy in Phase-change Materials," *Nature Communications* 8:1446 (2017), which is hereby incorporated by reference in its entirety). These additional utilities are also contemplated for the compounds and compositions described herein.

EXAMPLES

The examples below are intended to exemplify the practice of embodiments of the disclosure but are by no means intended to limit the scope thereof.

Materials & Methods for Examples 1-3

All reactions were monitored by thin-layer chromatography (TLC) using Merck silica gel 60 F254 plates (0.25 mm). TLC plates were visualized using UV light (254 nm). Silica column chromatography was performed using Merck Silica Gel 60 (230-400 mesh). Infrared spectra were recorded neat on an Agilent Cary 630 FTIR. $^1$H and $^{13}$C NMR were recorded on a Bruker Avance 400 spectrometer at 400 MHz and 100 MHz, respectively. Data for NMR spectra are recorded as follows: chemical shift (δ, ppm), multiplicity (s, singlet; d, doublet; t, triplet; q, quartet; m, multiplet), integration, and coupling constant (J, Hz). High-resolution mass spectra (ESI, APCI) were recorded by the Imperial College London Department of Chemistry Mass Spectroscopy Service using a Micromass Autospec Premier and Micromass LCT Premier spectrometer. High magnification images were obtained on a Nikon TE2000-E microscope with a Nikon Plan 10x/0.25 10.5 mm WD objective, Thorlabs DCU-224C camera, and a CoolLED PE-100 W illuminate. Low magnification digital images were acquired using a Celestron Handheld Digital Microscope Pro.

UV-Vis Absorbance Spectroscopy: UV-vis adsorption spectra were obtained with a Cary 50 Bio UV-vis spectrophotometer in a UV Quartz cuvette with a path length of 10 mm. Compounds were dissolved in chloroform at a concentration of 0.0125 mg/ml. The UV-vis absorption was first recorded in the dark for 5 min, then samples were irradiated with the specified wavelength until no change in their absorbance was observed. Samples were irradiated with a 100 W Blak-Ray B-100APR lamp (365 nm, 8.9 mW/cm$^2$) and the following LED light sources from Thor Labs M340L4 (340 nm, 2.22 µW/mm$^2$), M395L4 (395 nm, 6.7 µW/mm$^2$), and M530L3 (530 nm, 9.5 µW/mm$^2$).

Differential Scanning Calorimetry (DSC): DSC analysis was conducted on a DSC 250 (TA Instruments) with an RSC 90 cooling component. All samples were weighed using a TGA Q500 (TA Instruments) and heated at a rate of 10° C./min unless otherwise noted. All E isomers were melted and cooled to −85° C. before reheating. Liquid Z isomers 1', 3', and 4' were first cooled to −85° C. Solid Z isomers 1-4 and 2' were melted and cooled to −85° C. In DSC experiments with a scan rate of 1° C./min, the Z isomers were heated below their respective $T_{iso}$ to prevent the Z-to-E reversion. To determine the ΔHiso of Z isomers, samples were heated from 20° C. until the thermal isomerization was completed.

Preparation of Z-isomer Samples for DSC Measurement: Z isomers were obtained by dissolving each E isomer in dichloromethane and irradiating the sample with the appropriate wavelength of light until the photostationary state was reached. The Z-rich samples were concentrated, dried under high-vacuum, and then transferred to DSC pans for analysis.

Thin Film Preparation: Thin-film samples were prepared by placing 5 mg of the E-isomer on a clean glass slide and heated on a hot plate until the sample was melted. The melt was sandwiched with another glass slide to spread and fill the entire area. Then the sample was slowly cooled to room temperature. Temperature was controlled using an ethanol bath with an NESLAB-CC-100 chiller or VWR Advanced hot plate stirrer.

Optical crystallization of thin film samples of 2'-4' was performed with the following procedure. A thin film was heated in the dark above the $T_m$ of the E and Z-isomers. The sample was cooled to 10° C. above the $T_c$ of the E-isomer and irradiated with the appropriate light source for 10 min to induce E-Z photoisomerization. Half the sample was covered, cooled to the specified temperature, and irradiated for 10-15 min with the appropriate wavelength of light to trigger Z-E isomerization and induce crystallization. After light induced crystallization the cover was removed, and images were taken on an optical microscope at room temperature.

Optical crystallization of thin film samples of photoswitch 1' was performed using the following procedure. A crystalline thin film at room temperature was irradiated with 365 nm light for 10 min. The liquefied film was cooled to the specified temperature and half the sample was covered with a mask. The sample was irradiated for 10 min with 530 nm light to trigger Z-E photoisomerization to induce crystallization. After light irradiation, the cover was removed and images were taken on an optical microscope at room temperature.

Optical crystallization of a thin film of 3 was performed with the following procedure. A thin film was heated in the dark above the Tiso to ensure the thermal isomerization of any remaining Z-isomers. The E-isomer was cooled to the specified temperature and half of the sample was covered. The sample was irradiated with 365 nm light for 5 min and the cover was removed. Images were then taken with an optical microscope at room temperature.

Theoretical Calculations: Molecular switches 1'-4' along with their parent derivatives 1-4 were optimized to their minimum-energy geometry by using the Density Functional Theory (DFT) framework at the B3LYP/6-31G(d,p) level of theory (Becke, "Density-Functional Thermochemistry. III. The Role of Exact Exchange," *J. Chem. Phys.* 98:5648-5652 (1993); Rassolov et al., "6-31G* Basis Set for Third-Row Atoms," *J. Comput. Chem.* 22:976-984 (2001), which are hereby incorporated by reference in their entirety) including the Grimme's D3 dispersion correction (Grimme et al., "A Consistent and Accurate ab initio Parametrization of Density Functional Dispersion Correction (DFT-D) for the 94 Elements H-Pu," *J. Chem. Phys.* 132:154104 (2010); Grimme et al., "Effect of the Damping Function in Dispersion Corrected Density Functional Theory," *J. Comput. Chem.* 32:1456-1465 (2011), which are hereby incorporated by reference in their entirety). Among all the possible conformations for both E and Z isomers, the most stable structures were chosen to analyze direction and magnitude of the molecular dipole moment (FIGS. 1 and 2). All the calculations were performed using the Gaussian-16.A02 suite of programs (Gaussian 16, Revision A.02, Frisch et al., Gaussian, Inc., Wallingford CT, 2016, which is hereby incorporated by reference in its entirety) and the dipole moment representations were created using the Chemcraft 1.8 software (Chemcraft. https://www.chemcraftprog.com (accessed Dec. 20, 2019), which is hereby incorporated by reference in its entirety).

Example 1—Synthesis of Parent Arylazopyrazoles 1-4

FIG. 1 show previous examples of azobenzene (Ishiba et al., "Photoliquefiable Ionic Crystals: A Phase Crossover Approach for Photon Energy Storage Materials with Functional Multiplicity," *Angew. Chem., Int. Ed.* 54:1532-1536 (2015); Han et al., "Optically-Regulated Thermal Energy Storage in Diverse Organic Phase-Change Materials," *Chem. Commun.* 54:10722-10725 (2018); Wang et al., "Demonstration of an Azobenzene Derivative Based Solar Thermal Energy Storage System," *J. Mater. Chem. A* 7:15042-15047 (2019); Masutani et al., "A Liquid Azobenzene Derivative as a Solvent-Free Solar Thermal Fuel," *Chem. Commun.* 50:15803-15806 (2014); Han et al., "Optically-Controlled Long-Term Storage and Release of Thermal Energy in Phase-Change Materials," *Nat. Commun.* 8:1446 (2017), which are hereby incorporated by reference in their entirety) and arylazopyrazole (Zhao-Yang et al., "Efficient Co-Harvesting of Solar Energy and Low-Grade Heat by Molecular Photoswitches for High Energy Density, Long-Term Stable Solar Thermal Battery," *ChemRxiv doi.org*/10.26434/chemrxiv.9730694.v1 (2019), which is hereby incorporated by reference in its entirety) derivatives that are reported to undergo photo-triggered crystallization from a liquid Z state to a solid E state for thermal energy release applications. The azobenzene derivative (FIG. 1, a) reported by Han et al., "Optically-Regulated Thermal Energy Storage in Diverse Organic Phase-Change Materials," *Chem. Commun.* 54:10722-10725 (2018) and Han et al., "Optically-Controlled Long-Term Storage and Release of Thermal Energy in Phase-Change Materials," *Nat. Commun.* 8:1446 (2017), which are hereby incorporated by reference in their entirety, was integrated with other traditional organic phase-change materials such as fatty acids and paraffins to optically regulate the heat storage and release from the phase-change composite materials. Azobenzene derivatives exhibit a short Z isomer half-life in both solution and in the condensed phase at room temperature, which limits the long-term storage of latent heat in the Z isomer liquid phase. Arylazopyrazoles functionalized with an alkyl or terminal alkenyl ether group on benzene ring were recently reported by Zhao-Yang et al., "Efficient Co-Harvesting of Solar Energy and Low-Grade Heat by Molecular Photoswitches for High Energy Density, Long-Term Stable Solar Thermal Battery," *ChemRxiv doi.org*/10.26434/chemrxiv.9730694.v1 (2019), which is hereby incorporated by reference in its entirety. This work showed the light-triggered crystallization of Z isomers at room temperature, which was enabled by the relatively low melting points of select Z isomers (19-37° C.). However, their design still renders the Z isomers to be highly crystalline below room temperature, which prevents the liquid-to-solid phase change and Z-to-E isomerization below room temperature.

Compounds 1-4 (FIG. 1) were prepared according to previous literature procedures (Compounds 1, 3: Weston et al., "Arylazopyrazoles: Azoheteroarene Photoswitches Offering Quantitative Isomerization and Long Thermal Half-Lives," *J. Am. Chem. Soc.* 136:11878-11881 (2014), which is hereby incorporated by reference in its entirety; Compounds 2, 4: Calbo et al., "Tuning Azoheteroarene Photoswitch Performance through Heteroaryl Design," *J. Am. Chem. Soc.* 139:1261-1274 (2017); Calbo et al., "A Combinatorial Approach to Improving the Performance of Azoarene Photoswitches," *Beilstein J. Org. Chem.* 15:2753-2764 (2019), which is hereby incorporated by reference in its entirety).

Example 2—Synthesis of Intermediates and Arylazopyrazoles 1'-4'

Compounds 1'-4' (FIG. 1) were prepared using the procedures set forth in this example.

Synthesis of Compound 1'

Compound 1' was prepared using the synthesis scheme illustrated in FIG. 2 via intermediate reactants A-C. These steps are discussed below:

Dodecyl 2-Bromoacetate (A): To a stirred solution of bromoacetic acid (5.56 g, 40 mmol) in toluene (50 mL) was added dodecanol (7.8 mL, 35 mmol) and conc. sulfuric acid (0.1 mL). The mixture was refluxed under nitrogen at 130° C. using a Dean-Stark condenser for 4 hours. The mixture was cooled to room temperature, washed with water (50 mL), and extracted with ethyl acetate (30 mL) twice. The organic layers were then washed with 1% $NaHCO_3$ aq., dried (magnesium sulfate), and concentrated to dryness under reduced pressure. Purification (silica gel, pentane:ethyl acetate, 9:1) produced the desired product as a colourless oil (9.1 g, 85% yield). This compound is previously known in the literature and uses the synthetic procedure provided with some modification (Zhang et al., "Synthesis of Novel Oil-Soluble Fluorinated Surfactants via Wittig-Horner Reaction," *Tetrahedron* 75:1652-1657 (2019), which is hereby incorporated by reference in its entirety).

The intermediate reactant, dodecyl 2-bromoacetate (A), was confirmed by NMR, mass spectrometry, and infrared spectroscopy as follows:

$^1$H NMR: (400 MHz, Chloroform-d) δ 4.16 (t, J=6.8 Hz, 2H, $COOCH_2$), 3.83 (s, 2H, $CH_2Br$), 1.66 (p, J=6.8 Hz, 2H, $OCH_2CH_2$), 1.37-1.18 (m, 18H, $CH_2$), 0.92-0.83 (m, 3H, $CH_3$).

$^{13}$C NMR: (101 MHz, Chloroform-d) δ 167.47, 66.63, 32.06, 29.77, 29.76, 29.69, 29.62, 29.49, 29.33, 28.55, 26.10, 25.89, 22.84, 14.27.

No parent ion was observed by MS ES+.

$v_{max}$/cm$^{-1}$ (compressed solid): 2920, 2851, 1435, 1465, 1276, 1160, 1109, 995.

3-(2-Phenylhydrazineylidene)pentane-2,4-dione (B): To a stirred solution of analine (500 mg, 4.76 mmol) in aqueous HCl (2 M, 3 mL) and acetone (3 mL) at 0° C. was added a solution of sodium nitrite (394 mg, 5.71 mmol) in water (2 mL) dropwise. The resulting solution was stirred for 20 min in an ice bath. In a separate flask, acetylacetone (0.8 mL, 7.14 mmol) in acetone (2 mL) and water (2 mL) was stirred with sodium acetate (1.2 g, 9.52 mmol). The formed in situ diazonium salt was then added dropwise to the acetylacetone solution at 0° C. The reaction was stirred for 1 hour at room temperature after which an orange precipitate was formed. The precipitate was collected by vacuum filtration and washed with cold ethanol (3 ml) to give the desired product with the presence of an unknown impurity (832 mg, 76% yield). The product was taken on crude. This compound is previously known in the literature (Weston et al., "Arylazopyrazoles: Azoheteroarene Photoswitches Offering Quantitative Isomerization and Long Thermal Half-Lives," *J. Am. Chem. Soc.* 136:11878-11881 (2014), which is hereby incorporated by reference in its entirety).

The intermediate reactant, 3-(2-Phenylhydrazineylidene)pentane-2,4-dione (B), was confirmed by NMR as follows:

$^1$H NMR: (400 MHz, Chloroform-d) δ 14.71 (s, 1H, NH), 7.39 (m, 4H, ArH), 7.20 (m, 1H, ArH), 2.60 (s, 3H, CH$_3$), 2.48 (s, 3H, CH$_3$).

(E)-3,5-Dimethyl-4-(phenyldiazenyl)-1H-pyrazole (C): To a stirred solution of 3-(2-phenylhydrazineylidene)pentane-2,4-dione (B) (300 mg, 1.47 mmol) in dichloromethane (5 mL) was added hydrazine (1.8 mL, 1 M in THF) and the resulting solution was stirred at 35° C. under a nitrogen atmosphere. After 2 hours, the solution was washed with aqueous HCl (1 M, 30 mL) and extracted with dichloromethane (2×20 mL). The organic layers were dried (magnesium sulfate), combined, and concentrated to dryness under reduced pressure. Purification (silica gel, dichloromethane:ethyl acetate, 4:1) produced the desired compound as a yellow solid (222 mg, 57% yield). This compound is previously known in the literature (Devi et al., "Evaluation of Substituent Effect in Z-Isomer Stability of Arylazo-1H-3,5-dimethylpyrazoles: Interplay of Steric, Electronic Effects and Hydrogen Bonding," *J. Org. Chem.* 83:4307-4322 (2018), which is hereby incorporated by reference in its entirety).

The intermediate reactant, (E)-3,5-Dimethyl-4-(phenyldiazenyl)-1H-pyrazole (C), was confirmed by NMR and mass spectrometry as follows:

$^1$H NMR: (400 MHz, Chloroform-d) δ 7.84-7.79 (m, 2H, ArH), 7.51-7.45 (m, 2H, ArH), 7.42-7.37 (m, 1H, ArH), 2.65 (s, 6H, CH$_3$). NH not observed.

$^{13}$C NMR: (101 MHz, Chloroform-d) δ 153.58, 141.49, 134.77, 129.49, 128.93, 121.86, 12.18.

MS (ES+): m/z calculated for C$_{11}$H$_{13}$N$_4$[M+H]$^+$ 201.1140, found 201.1134.

Dodecyl (E)-2-(3,5-Dimethyl-4-(phenyldiazenyl)-1H-pyrazol-1-yl)acetate (Compound 1'): To a stirred solution of 3,5-dimethyl-4-(phenyldiazenyl)-1H-pyrazole (C) (130 mg, 0.65 mmol) in anhydrous THF (2 mL) was added dodecyl 2-bromoacetate (A) (400 mg, 1.30 mmol) and potassium carbonate (360 mg, 1.30 mmol), and the resulting solution was stirred at room temperature under a nitrogen atmosphere. After 10 hours, the solution was filtered and concentrated to dryness under reduced pressure. Purification (silica gel, pentane:ethyl acetate, 7:3) produced the desired compound which was recrystallized from pentane as a yellow solid (172 mg, 61% yield).

Compound 1' was confirmed by NMR, mass spectrometry, and infrared spectroscopy as follows:

$^1$H NMR: (400 MHz, Chloroform-d) δ 7.77 (d, J=7.7 Hz 2H, ArH), 7.46-7.41 (m, 2H, ArH), 7.38-7.32 (m, 1H, ArH), 4.81 (s, 2H, CH$_2$COO), 4.16 (t, J=6.7 Hz, 2H, COOCH$_2$), 2.54 (s, 3H, CH$_3$), 2.51 (s, 3H, CH$_3$), 1.61 (q, J=6.9 Hz, 2H, OCH$_2$CH$_2$), 1.33-1.19 (m, 18H, CH$_2$CH$_2$), 0.88 (t, J=6.7 Hz, 3H, CH$_2$CH$_3$).

$^{13}$C NMR: (101 MHz, Chloroform-d) δ 167.45, 153.56, 143.26, 139.98, 135.46, 129.48, 128.89, 121.86, 66.12, 50.62, 31.96, 29.67, 29.39, 29.20, 28.60, 28.51, 25.81, 22.73, 14.16, 14.04, 9.84.

MS (ES$^+$): m/z calculated for C$_{25}$H$_{39}$N$_4$O$_2$ [M+H]$^+$ 427.3073, found 427.3069.

ν$_{max}$/cm$^{-1}$ (compressed solid): 2919, 2849, 1734, 1551, 1413, 1394, 1220, 998.

Synthesis of Compound 2'

Compound 2' was prepared using the synthesis scheme illustrated in FIG. 3 via intermediate reactants A, D, and E. Dodecyl 2-Bromoacetate (A) was prepared as described above with respect to compound 1'. These additional steps are discussed below.

Dodecyl 2-(3-Nitro-1H-pyrazol-1-yl)acetate (D): To a stirred solution of 3-nitro-1H-pyrazole (250 mg, 2.21 mmol) in anhydrous DMF (5 mL) was added potassium carbonate (611 mg, 4.42 mmol) and dodecyl 2-bromoacetate (815 mg, 2.65 mmol) and the resulting mixture was stirred at room temperature under a nitrogen atmosphere. After 18 hours, the solution was washed with LiCl (5% aqueous solution, 30 mL) and extracted with ethyl acetate (2×20 mL). The organic layers were combined, dried (magnesium sulfate), and concentrated to dryness under reduced pressure. Purification (silica gel, pentane:ethyl acetate, 3:2) produced the desired compound as a white waxy solid (598 mg, 80% yield).

The intermediate reactant, dodecyl 2-(3-Nitro-1H-pyrazol-1-yl)acetate (D), was confirmed by NMR, mass spectrometry, and infrared spectroscopy as follows:

$^1$H NMR (400 MHz, DMSO-d6) δ 8.04 (d, J=2.6 Hz, 1H, pyrazole-H), 7.08 (d, J=2.5 Hz, 1H, pyrazole-H), 5.27 (s, 2H, CH$_2$COO), 4.11 (t, J=6.5 Hz, 2H, COOCH$_2$), 1.61-1.51 (m, 2H, CH$_2$), 1.27-1.21 (m, 18H, CH$_2$CH$_2$), 0.88-0.81 (m, 3H, CH$_2$CH$_3$).

$^{13}$C NMR (101 MHz, DMSO-d6) δ 167.20, 155.39, 135.61, 102.94, 65.37, 53.74, 31.31, 29.06, 29.01, 28.96, 28.95, 28.73, 28.59, 27.96, 25.20, 22.11, 13.93.

MS (FTMS+pAPCI): m/z calculated for C$_{17}$H$_{30}$N$_3$O$_4$ [M+H]$^+$ 340.2231, found 340.2231.

ν$_{max}$/cm$^{-1}$ (compressed solid): 3357, 3129, 2930, 1685, 1388, 1248, 1154, 803.

Dodecyl 2-(3-Amino-1H-pyrazol-1-yl)acetate (E): To stirred solution of dodecyl 2-(3-nitro-1H-pyrazol-1-yl)acetate (300 mg, 0.89 mmol) in a mixture of ethanol and ethyl acetate (1:1, 5 mL) under nitrogen was added palladium hydroxide on carbon (10 mg) and hydrogen was purged through the solution using balloons. After 16 hours stirring at room temperature under a pressure of hydrogen, the solution was purged with nitrogen and filtered through celite. The filtrate was then concentrated to dryness under reduced pressure to give the desired product (250 mg, 91% yield).

The intermediate reactant, dodecyl 2-(3-Amino-1H-pyrazol-1-yl)acetate (E), was confirmed by NMR, mass spectrometry, and infrared spectroscopy as follows:

$^1$H NMR: (400 MHz, Chloroform-d) δ 7.17 (d, J=2.4 Hz, 1H, pyrazole-H), 5.63 (d, J=2.4 Hz, 1H, pyrazole-H), 4.64 (s, 2H, CH$_2$COO), 4.11 (t, J=6.7 Hz, 2H, COOCH$_2$), 3.67 (s, 2H, NH$_2$), 1.59 (p, J=6.9 Hz, 2H, CH$_2$), 1.23 (s, 18H, CH$_2$CH$_2$), 0.85 (t, J=6.8 Hz, 3H, CH$_2$CH$_3$).

$^{13}$C NMR: (101 MHz, Chloroform-d) δ 168.47, 155.06, 132.19, 94.40, 65.86, 52.68, 31.96, 29.68, 29.60, 29.54, 29.39, 29.23, 28.50, 25.83, 25.81, 22.73, 14.17.

MS (ES+): m/z calculated for C$_{17}$H$_{32}$N$_3$O$_2$ [M+H]$^+$ 310.2495, found 310.2496.

ν$_{max}$/cm$^{-1}$ (compressed solid): 3399, 3321, 2955, 2917, 2829, 1737, 1545, 1494, 1437, 1204, 1178, 964.

Dodecyl (E)-2-(3-(Phenyldiazenyl)-1H-pyrazol-1-yl)acetate (Compound 2): To a stirred solution of dodecyl 2-(3-amino-1H-pyrazol-1-yl)acetate (250 mg, 0.81 mmol) in dichloromethane/chloroform (1:1, 3 mL) was added acetic acid (0.23 mL, 4.05 mmol) followed by nitrosobenzene (130 mg, 1.21 mmol) and the resulting solution was stirred at 40° C. under a nitrogen atmosphere. After 16 hours, the solution was concentrated to dryness under reduced pressure. Purification (silica gel, pentane:ethyl acetate, 4:1) produced the desired compound which was recrystallized from methanol resulting in yellow crystals (73 mg, 23% yield). A significant amount of product during the recrystallization in methanol was unintentionally transformed into the methoxy ester by transesterification.

Compound 2' was confirmed by NMR, mass spectrometry, and infrared spectroscopy as follows:

$^1$H NMR: (400 MHz, Chloroform-d) δ 7.97-7.94 (m, 2H, ArH), 7.54-7.46 (m, 4H, pyrazole-H & ArH), 6.73 (d, J=2.5 Hz, 1H, pyrazole-H), 5.02 (s, 2H, CH2COO), 4.19 (t, J=6.7 Hz, 2H, COOCH2), 1.64 (p, J=6.8 Hz, 2H, CH2), 1.24 (s, 18H, CH$_2$CH$_2$), 0.88 (t, J=6.8 Hz, 3H, CH$_2$CH$_3$).

$^{13}$C NMR: (101 MHz, Chloroform-d) δ 167.31, 163.95, 152.61, 132.49, 131.21, 128.98, 122.98, 96.79, 66.22, 53.79, 31.88, 29.59, 29.58, 29.51, 29.44, 29.44, 29.13, 28.40, 25.73, 22.66, 14.09.

MS (ES+): m/z calculated for $C_{23}H_{35}N_4O_2$ $[M+H]^+$ 399.2760, found 399.2776.

$v_{max}$/cm$^1$ (compressed solid): 2958, 2917, 2850, 1739, 1331, 1219, 1206, 963.

Synthesis of Compound 3'

Compound 3' was prepared using the synthesis scheme illustrated in FIG. 4 via intermediate reactants (A) and (F). Dodecyl 2-Bromoacetate (A) was prepared as described above with respect to compound 1'. These additional steps are discussed below:

(E)-4-(Phenyldiazenyl)-1H-pyrazole (F): To a stirred solution of 4-amino-1H-pyrazole (432 mg, 5.09 mmol) in a 1:1 mixture of dichloromethane:chloroform (20 mL) was added acetic acid (1.5 mL) followed by nitrosobenzene (600 mg, 5.60 mmol). The mixture was stirred under a nitrogen atmosphere at 40° C. for 2 hours after which it was concentrated to dryness under reduced pressure. Purification (silica gel, DCM: EtOAc, 4:1) produced the desired compound as a yellow solid (542 mg, 62% yield).

The intermediate reactant, (E)-4-(Phenyldiazenyl)-1H-pyrazole (F), was confirmed by NMR and mass spectrometry as follows:

$^1$H NMR: (400 MHz, DMSO-d6) δ 13.48 (s, 1H, NH), 8.28 (s, 2H, pyrazole-H), 7.77-7.73 (m, 2H, ArH), 7.56-7.50 (m, 2H, ArH), 7.49-7.44 (m, 1H, ArH).

$^{13}$C NMR: (101 MHz, DMSO-d6) δ 152.37, 140.98, 130.25, 129.31, 121.76.

MS (ES+): m/z calculated for $C_9H_9N_4$ $[M+H]^+$ 173.0828, found 173.0827.

Dodecyl (E)-2-(4-(phenyldiazenyl)-1H-pyrazol-1-yl)acetate (Compound 3'): To a stirred solution of 4-phenyldiazenyl-1H-pyrazole (150 mg, 0.87 mmol) in anhydrous DMF (8 mL) was added cesium carbonate (425 mg 1.31 mmol) followed by dodecyl 2-bromoacetate (321 mg, 1.05 mmol). After 2 hours stirring at room temperature, the mixture was filtered and the filtrate was washed with 5% LiCl aqueous solution (30 mL) and extracted with ethyl acetate thrice (20 mL). The organic layers were combined, dried (magnesium sulfate), and concentrated to dryness under reduced pressure. The crude mixture was washed with pentane resulting in precipitation of a yellow solid which was collected by vacuum filtration. The solid was then recrystallized from pentane to produce the desired product as a pale yellow solid (201 mg, 58% yield).

Compound 3' was confirmed by NMR, mass spectrometry, and infrared spectroscopy as follows:

$^1$H NMR: (400 MHz, Chloroform-d) δ 8.11 (s, 1H, pyrazole-H), 8.07 (s, 1H, pyrazole-H), 7.84-7.76 (m, 2H, ArH), 7.53-7.44 (m, 2H, ArH), 7.47-7.38 (m, 1H, ArH), 4.96 (s, 2H, CH$_2$COO), 4.20 (t, J=6.8 Hz, 2H, COOCH$_2$), 1.69-1.60 (m, 2H, CH$_2$), 1.37-1.19 (m, 18H, CH$_2$CH$_2$), 0.96-0.83 (m, 3H, CH$_3$).

$^{13}$C NMR: (101 MHz, Chloroform-d) δ 167.36, 153.00, 142.44, 133.72, 130.52, 129.16, 128.18, 122.41, 66.42, 53.88, 32.04, 29.75, 29.74, 29.66, 29.61, 29.47, 29.28, 28.55, 25.87, 22.82, 14.26.

MS (ESI+): m/z calculated for $C_{23}H_{35}N_4O_2$ $[M+H]^+$ 399.2755, found 399.2763.

$v_{max}$/cm$^1$ (compressed solid): 2956, 2917, 2850, 1731, 1535.7, 1457.4, 1387.5, 1225.4, 1162, 1012, 963, 793.

Synthesis of Compound 4'

Compound 4' was prepared using the synthesis scheme illustrated in FIG. 5 via intermediate reactants A, G, and H. Dodecyl 2-Bromoacetate (A) was prepared as described above with respect to compound 1'. These additional steps are discussed below:

2,6-Difluoro-nitrosobenzene (G): A stirred solution of 2,6-difluoroanaline (500 mg, 3.87 mmol) in dichloromethane (5 mL) was cooled to 0° C. under a nitrogen atmosphere. Oxone (589 mg, 3.87 mmol) was dissolved in water (20 mL) and added dropwise to the solution. The resulting bi-phasic mixture was stirred vigorously at room temperature for 8 hours after which consumption of starting material was confirmed by TLC. The reaction was diluted with dichloromethane and the organic layer was separated. The aqueous layer was washed with dichloromethane and the organic layers were combined, dried (magnesium sulfate), and concentrated to dryness under reduced pressure. The product was immediately taken forwards crude as a green/brown oil (471 mg, 85% yield).

(E)-4-((2,6-Difluorophenyl)diazenyl)-1H-pyrazole (H): To a stirred solution of 4-amino-1H-pyrazole (300 mg, 3.62 mmol) in acetic acid (5 mL) was added 2,6-difluoronitrosobenzene (471 mg, 3.29 mmol) in dichloromethane and the resulting solution as stirred at 40° C. for 4 hours under a nitrogen atmosphere. The solution was then concentrated to dryness under reduced pressure. Purification (silica gel, ethyl acetate:pentane, 7:3) resulted in the desired product as a yellow solid (438 mg, 64% yield).

The intermediate reactant, (E)-4-((2,6-Difluorophenyl)diazenyl)-1H-pyrazole (H), was confirmed by NMR, mass spectrometry, and infrared spectroscopy as follows:

$^1$H NMR: (400 MHz, Chloroform-d) δ 11.01 (s, 1H, NH), 8.23 (s, 2H, pyrazole-H), 7.32-7.22 (m, 1H, ArH), 7.07-6.98 (m, 2H, ArH).

$^{13}$C NMR: (101 MHz, Chloroform-d) δ 155.83 (dd, J=257.8, 4.6 Hz), 142.60, 131.68-131.27 (m), 129.82, 129.81 (d, J=20.6 Hz), 112.78-112.39 (m).

$^{19}$F NMR: (377 MHz, Chloroform-d) 6-122.16.

MS (ES+): m/z calculated for $C_9H_7N_4F_2[M+H]^+$ 209.0639, found 209.0641.

vmax/cm$^{-1}$ (compressed solid): 3160, 2925, 2855, 1614, 1470, 1239, 1012, 993.

Dodecyl (E)-2-(4-((2,6-Difluorophenyl)diazenyl)-1H-pyrazol-1-yl)acetate (Compound 4): To a stirred solution of 4-((2,6-difluorophenyl)diazenyl)-1H-pyrazole (150 mg, 0.72 mmol) in anhydrous DMF (5 mL) was added cesium carbonate (352 mg, 1.08 mmol) and dodecyl 2-bromoacetate (244 mg, 0.79 mmol) and the resulting solution was stirred at room temperature for 16 hours under a nitrogen atmosphere. Another 1.2 equiv of dodecyl 2-bromoacetate was then added and the solution stirred for a further 6 hours. The solution was filtered, washed with aqueous LiCl (5%, 30 mL), and extracted with ethyl acetate (2×20 mL). The organic layers were combined, dried (magnesium sulfate), and concentrated to dryness under reduced pressure. Purification (silica gel, pentane:ethyl acetate, 7:3) gave the desired product as an orange waxy solid (220 mg, 70% yield).

Compound 4' was confirmed by NMR, mass spectrometry, and infrared spectroscopy as follows:

$^1$H NMR: (400 MHz, Chloroform-d) δ 8.17 (s, 1H, pyrazole-H), 8.08 (s, 1H, pyrazole-H), 7.30-7.23 (m, 1H, ArH), 7.05-6.97 (m, 2H, ArH), 4.96 (s, 2H, CH$_2$COO), 4.20 (t, J=6.8 Hz, 2H, COOCH$_2$), 1.65 (p, J=6.8 Hz, 2H, CH$_2$), 1.31-1.23 (m, 18H, CH$_2$CH$_2$), 0.88 (t, J=7.0 Hz, 3H, CH$_3$).

$^{19}$F NMR: (377 MHz, Chloroform-d) δ-122.09.

$^{13}$C NMR: (101 MHz, Chloroform-d) δ 167.00, 155.66 (dd, J=258.1, 4.5 Hz), 143.05, 133.48, 131.36 (m), 129.51 (t, J=10.3 Hz), 128.68, 112.45 (m), 66.34, 53.73, 31.87, 29.59, 29.58, 29.51, 29.43, 29.31, 29.12, 28.40, 25.72, 22.65, 14.08.

MS (ES+): m/z calculated for $C_{23}H_{33}N_4O_2F_2[M+H]^+$ 435.2572, found 435.2570.

$v_{max}$/cm$^{-1}$ (compressed solid): 2920, 2851, 1744, 1467, 1206, 1009.

Example 3—Comparative Analysis of Compounds 1-4 and Compounds 1'-4'

To achieve the light-triggered phase transition and heat release at extreme cold, a new functionalization strategy that stabilizes Z liquid phase at very low temperatures (−30° C., for example) while retaining E crystalline phase was introduced. The arylazopyrazole parent structures (FIG. 1, center) previously reported by Calbo et al. were selected ("A Combinatorial Approach to Improving the Performance of Azoarene Photoswitches," Beilstein J. Org. Chem. 15:2753-2764 (2019); "Tuning Azoheteroarene Photoswitch Performance through Heteroaryl Design," J. Am. Chem. Soc. 139:1261-1274 (2017), which are hereby incorporated by reference in their entirety). As discussed below, DSC measurements and photo-switching studies first revealed that all of the parent compounds 1-4 were unable to release thermal energy via light-triggered crystallization for various reasons. See FIGS. 6A-6D, 7, 8A-8D. Compounds 1 and 2, after initial melting and subsequent cooling, could not be optically triggered to crystallize as a result of relatively similar thermal characteristics for both isomers. After melting and cooling, they essentially form a stable liquid for both the E and Z isomeric forms. Compound 4 showed favorable thermal characteristics (i.e. liquid Z and crystalline E, as individually determined by DSC), but the Z-to-E switching below 39° C. (Tm of E form) did not result in any nucleation. Compound 3 showed crystallization by the reverse E-to-Z photo-isomerization, since the E form of compound 3 is less crystalline than its Z isomer. However, the photo-induced crystallization did not lead to the overall heat release, because of the larger thermal energy uptake by the isomerization process than the exothermicity from the crystallization. Nonetheless, this intriguing Z isomer crystallization is illustrated in detail in FIGS. 9A-9C and 10A-10B and discussed in more detail below as an alternative new method for potentially storing and releasing thermal energy with reduced activation steps.

As described in Example 2, the parent arylazopyrazole structures were modified to incorporate a dodecanoate group (1'-4'). See FIG. 1, right panel. Compounds 1'-4' were particularly designed to preserve the core electronic structure of the parent arylazopyrazoles, with a methylene linker between the alkyl ester group and the photoswitching moiety (FIG. 1, right panel). Comparative UV-Vis spectra of the compounds 1-4 and 1'-4' (FIGS. 8A-8D) showed that light absorption of each parent compound is mostly identical to that of respective alkyl-functionalized derivative. As shown in Table 1 below, the degrees of E-to-Z and Z-to-E photo-isomerization and the absorption spectra of photo-stationary state (PSS) were essentially un-changed after the functionalization of parent compounds. The E isomer contents in the photo-irradiated samples are minimal (2-3%), as measured by $^1$H NMR (Table 1).

TABLE 1

Percentage (%) of Z Isomers in UV-Irradiated samples ($^a$365 nm and $^b$340 nm) Measured by $^1$H NMR Prior to DSC Experiments

| Compound | 1 | 2 | 3 | 4 | 1' | 2' | 3' | 4' |
|---|---|---|---|---|---|---|---|---|
| % Z isomer | 99%$^a$ | 98%$^b$ | 98%$^b$ | 98%$^b$ | 98%$^a$ | 99%$^b$ | 97%$^b$ | 98%$^b$ |
| % E isomer | 90%$^c$ | 67%$^c$ | 50%$^d$ | 58%$^d$ | 88%$^c$ | 67%$^c$ | 53%$^d$ | 61%$^d$ |

% E isomers present at the E-rich PSS obtained by optically triggered reversion ($^c$530 nm and $^d$395 nm) were estimated using the formula: $f_{PSS}=(A_{PSS}-A_Z)/(A_E-A_Z)$ where $f_{PSS}$ is the fraction of E isomer present in PSS, and $A_{PSS}$, $A_E$ and $A_Z$ are the absorbances at the π-π* E-isomer absorption maximum. $A_Z$ values used are those of the Z-rich PSS due to near complete switching and low absorbance.

Phase Transition of Photo-Isomers

The drastic difference in crystallinity between E and Z forms of the designs was directly measured by differential scanning calorimetry (DSC) (FIGS. 6A-6D; 9B). The E isomers of compounds 1'-4' exhibited sharp melting peaks and subsequent crystallization peaks upon cooling, whereas such melting and crystallization features were absent (compounds 1', 3', and 4') or significantly reduced (compounds 2') for the Z isomer counterparts. The Z isomers of arylazopyrazoles were found computationally to have significantly higher polarity than the E isomers (compare FIGS. 11A-11D and 12A-12D), which likely contributes to liquid Z isomer liquid phase stability upon cooling, along with the increased bulkiness of Z isomers. The high polarity and bulkiness of Z isomers effectively disrupt the π-π interactions between aromatic groups and van der Waals interactions between the alkyl chains. This disruption reduces the ability of Z isomers to pack and form ordered crystals. The alkyl functionalized Z isomers were found to remain in the liquid phase either between −45° C. and 85° C. (compounds 1', 3', and 4') or between −30° C. and 10° C. (compound 2'). Compounds 1', 3', and 4' underwent glass transition below −45° C. and Z-to-E reverse isomerization above 85° C. Compound 2' partially crystallized at temperatures lower than −30° C. and cold-crystallizes at temperatures above 10° C.

To examine the impact of heating and cooling rates on the observed phase transitions, compounds 1'-4' were studied at a rate of 1° C./min by DSC. The E isomers of 1'-4' showed sharper melting and crystallization peaks, with minimal changes in phase transition temperatures and energies. By running slower measurements, two crystallization peaks at 32 and 37° C. for the poly morphs of compound 3' were resolved. The Z isomer of 1' exhibited new features including cold crystallization at −4° C. and melting at 47° C., indicating that the prolonged exposure of the amorphous solid to very low temperatures (below −50° C.) generates nucleation seeds which propagate upon thermal activation. The Z isomer of 2' exhibited a broad crystallization around 19° C. instead of cold-crystallization as previously seen at the faster scans. This emphasizes that compound 2' is more prone to crystallization compared to compounds 1', 3', and 4'. No impact of scan rate change for the Z isomers of 3' and 4' was found.

Regardless of the heating and cooling rate, there is a distinct difference observed between E and Z isomers of compounds 1'-4'; E isomers are highly crystalline while Z isomers are liquid at room temperature. This difference between E and Z forms presents an exciting opportunity for storing latent heat in liquid form and releasing the thermal energy upon photoswitching of the liquid, resulting in crystallization of the photogenerated isomer. For long-term latent heat storage, high Z stability of liquid form is required. The arylazopyrazoles, particularly the 4pzH derived compounds 3 and 4 (and thus 3' and 4'), were predicted to retain the Z isomer phase for significantly longer periods of time, before being optically triggered to release heat via Z-to-E isomerization.

Heat Storage and Release Mechanism

Upon investigation of the mechanisms of latent heat storage and triggered release, three types of energy storage-release cycles were discovered (FIGS. 9A-9C, 10A-10B). Most compounds (2', 3', and 4') undergo both heat and photon absorption to produce stable liquid phase of Z isomers (activation method I). See FIGS. 9A-9C. Initially, crystalline E isomers absorb heat to become liquid, which in turn absorbs UV photons to isomerize to liquid Z isomers. The Z liquid-phases are very stable within a wide range of temperatures (−45° C. to +85° C.) and can be cooled below 0° C. without losing latent heat. Visible light irradiation isomerizes Z back to E isomers that readily crystallize even at low temperatures, releasing thermal energy. This process is illustrated schematically in FIG. 9A, and visually using compound 1' in FIG. 6C.

In addition to the method previously described (I), compound 1' can also be activated by an alternative method (II). Method II (FIG. 9A) involves the solid-to-liquid phase change upon direct UV irradiation at room temperature. Compound 1' has the lowest heat of fusion ($\Delta H_m$) in E form (see Table 2 below) among the dodecanoate derivatives (compounds 1'-4') together with a relatively low melting point (Tm). This indicates that poorer packing of compound 1' in the solid state enables the direct phase transition upon UV photon uptake. As the Z isomers in the stable liquid phase form, compound 1' can be cooled to low temperatures and optically triggered to release heat, as with compounds 2'-4'.

TABLE 2

Thermal Parameters of E and Z Isomers

| | E | | | | Z | | | |
|---|---|---|---|---|---|---|---|---|
| Cmpd | $T_m$ (° C.) | $\Delta H_m$ (kJ/mol) | $T_c$ (° C.) | $\Delta H_c$ (kJ/mol) | $T_m$ (° C.) | $\Delta H_m$ (kJ/mol) | $T_c$ (° C.) | $\Delta H_c$ (kJ/mol) |
| 1 | 53 | 20 | 22 $^{cc}$ | 17 $^{cc}$ | 94 | 23 | — | — |
| 2 | 98 | 21 | −5 $^{cc}$ | 15 $^{cc}$ | 56 | 19 | — | — |
| 3 | 60 | 21 | 39 $^{cc}$ | 19 $^{cc}$ | 74 | 15 | 23 | 12 |
| 4 | 96 | 25 | 39 | 22 | 66 | 21 | 16 $^{cc}$ | 15 $^{cc}$ |
| 1' | 67 | 35 | 45 | 35 | Liq | Liq | Liq | Liq |
| 2' | 91 | 52 | 60 | 49 | 53 | 43 | −33 | 7 |
| 3' | 71 | 57 | 28 | 49 | Liq | Liq | Liq | Liq |
| 4' | 61 | 47 | 30 | 46 | Liq | Liq | Liq | Liq |

$\Delta H_m$: heat of fusion, $\Delta H_c$: heat of crystallization, superscript cc: cold-crystallization process. $T_c$ of compounds 1 and 2 Z isomers could not be accurately measured due to the concomitant Z-to-E isomerization during the melting of Z isomer and the formation of liquid consisting of Z and E mixtures.

This intriguing activation method III (FIG. 10A) was discovered with parent compound 3 (4pzH). This compound showed the opposite thermal behaviors for E and Z isomers (FIG. 10B): the Z isomer melts and crystallizes without significant supercooling, similar to the E isomers of the other compounds. The E isomer of compound 3, on the other hand, exhibited large supercooling and no crystallization process during cooling to −85° C. The amorphous solid can then be heated up to 39° C. to recover crystallinity. This cold-crystallization behavior indicated the lack of strong driving force for the molten E isomer to crystallize during the cooling cycle. For compound 3, at a scan rate of 1° C./min, lowering of the cold-crystallization temperature of the E isomer to −8° C. and minimal change in the Z isomer crystallization were observed. The higher crystallinity of the Z isomer over the E isomer allows for the latent heat storage in the E isomer liquid phase and the optical triggering of crystallization by UV-induced E-to-Z isomerization. The advantage of this activation method (III) is the absence of photon absorption requirement for the generation of the stable liquid phase.

Table 2 above summarizes thermal properties of all compounds measured by DSC (FIGS. 6A-6D). The lowest temperature at which thermal energy can be stored in Z isomer liquid phase is determined by $T_c$ of Z isomers. Compounds 1', 3', and 4' in Z isomeric forms are confirmed to be liquid above −45° C., and compound 2' can preserve liquid phase of Z isomers above −33° C. The highest temperature at which the optical triggering can induce crystallization via Z-to-E isomerization is defined by $T_c$ of E isomers.

Demonstration of Phase Transition and Heat Release at Low Temperatures

Figures 13A, 13B, 13C, 13D:
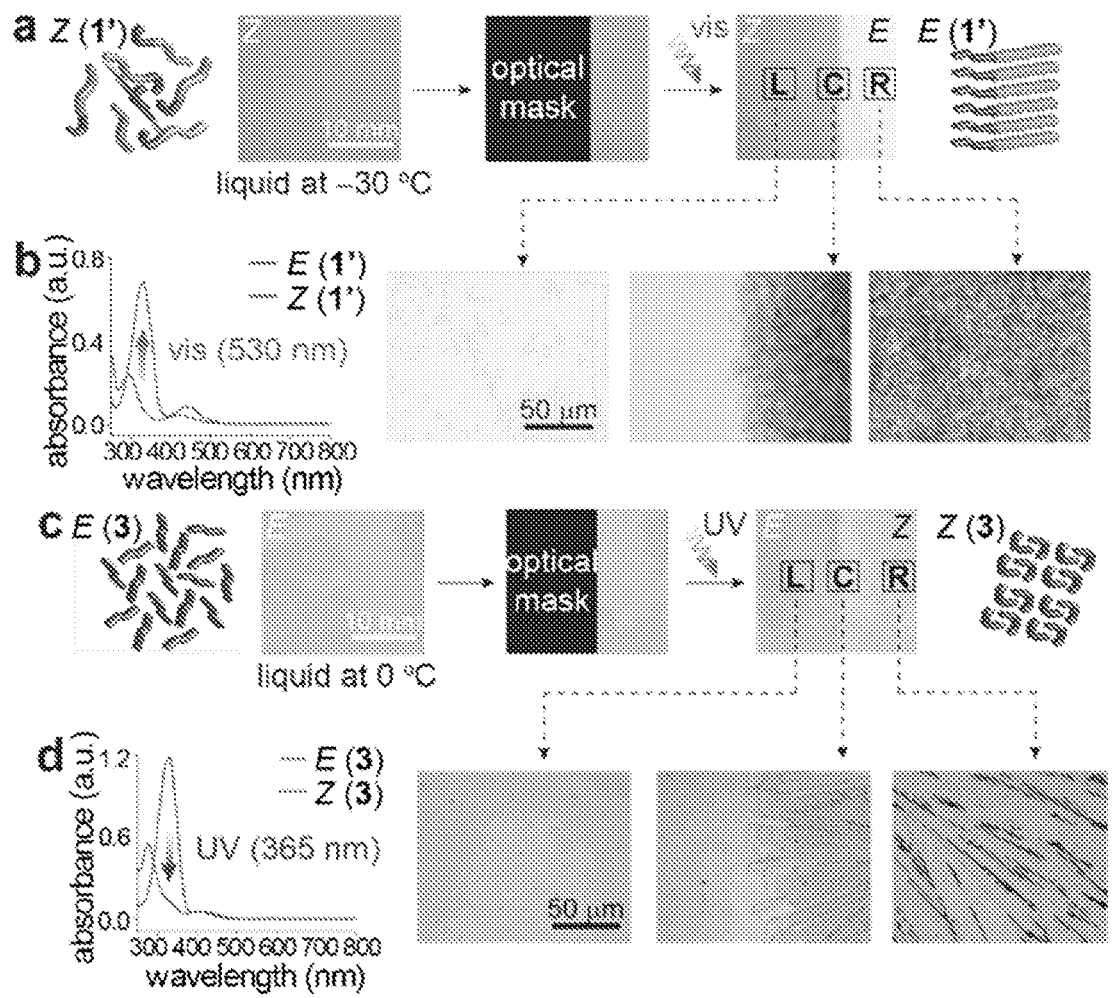
FIGS. 13A-13D show optical images of a stable liquid film (compound 1' as an example of group I and II compounds) that is irradiated with visible light (530 nm) at −30° C. and the subsequent crystallization of E isomers (FIG. 13A)(the left side of the film is covered by a mask to preserve Z isomers in stable liquid state; optical microscope images taken on the left (L), center (C), and right (R) spots of the film in FIG. 10A, showing liquid phase, interface between liquid and crystalline solid, and solid phase, respectively); UV-Vis absorption spectra of E and Z forms of compound 1' obtained in solution (FIG. 13B) (Z-to-E isomerization was induced by the absorption of 530 nm light by Z isomer (n-π* transition); optical images of a stable liquid film (compound 3 in group III) that is irradiated with UV light (365 nm) at 0° C. and the subsequent crystallization of Z isomers (FIG. 13C) (the left side of the film is covered by a mask to preserve E isomers in stable liquid state; optical microscope images taken on a film of compound 3 after selective crystallization by UV irradiation); and UV-Vis absorption spectra of E and Z forms of compound 3 and the process of UV-induced crystallization (FIG. 13D).
Figures 14C, 14D:
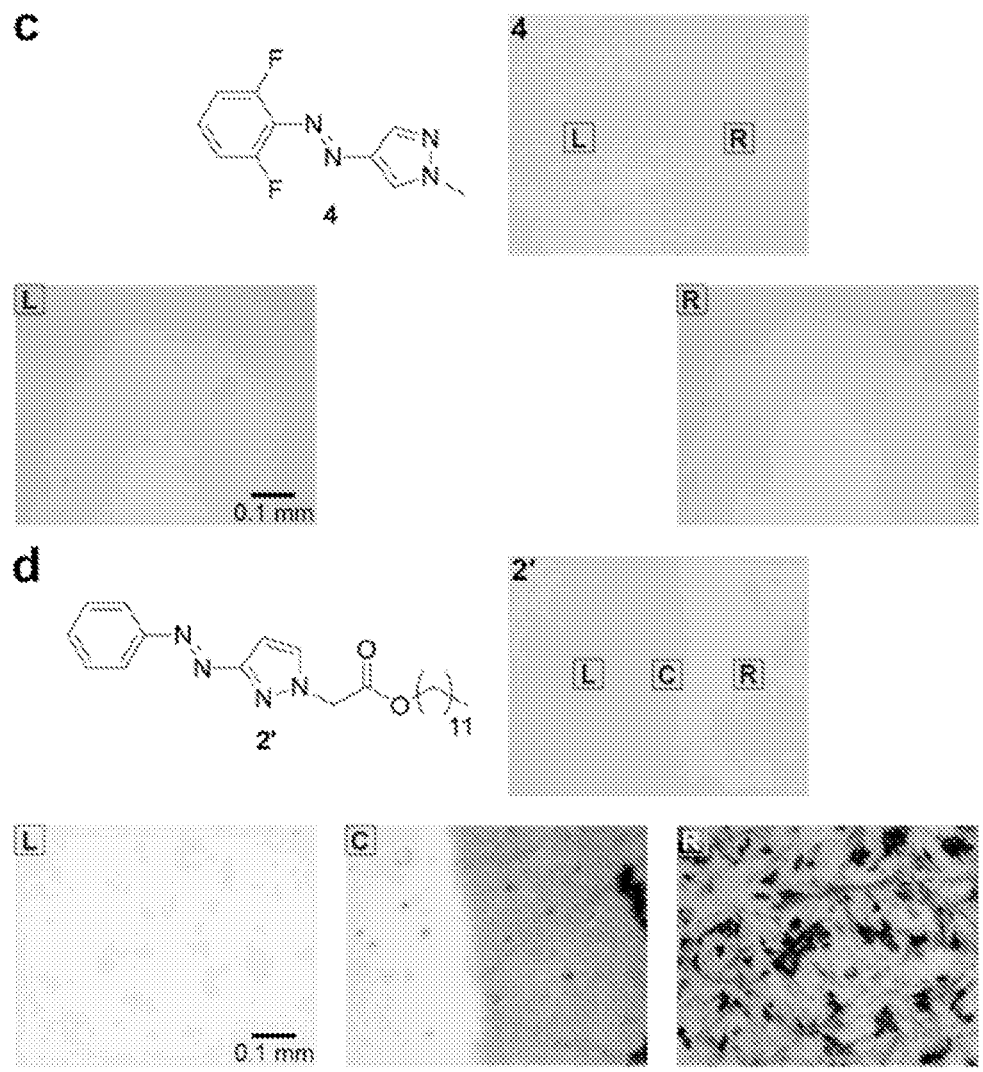
Figures 14E, 14F:
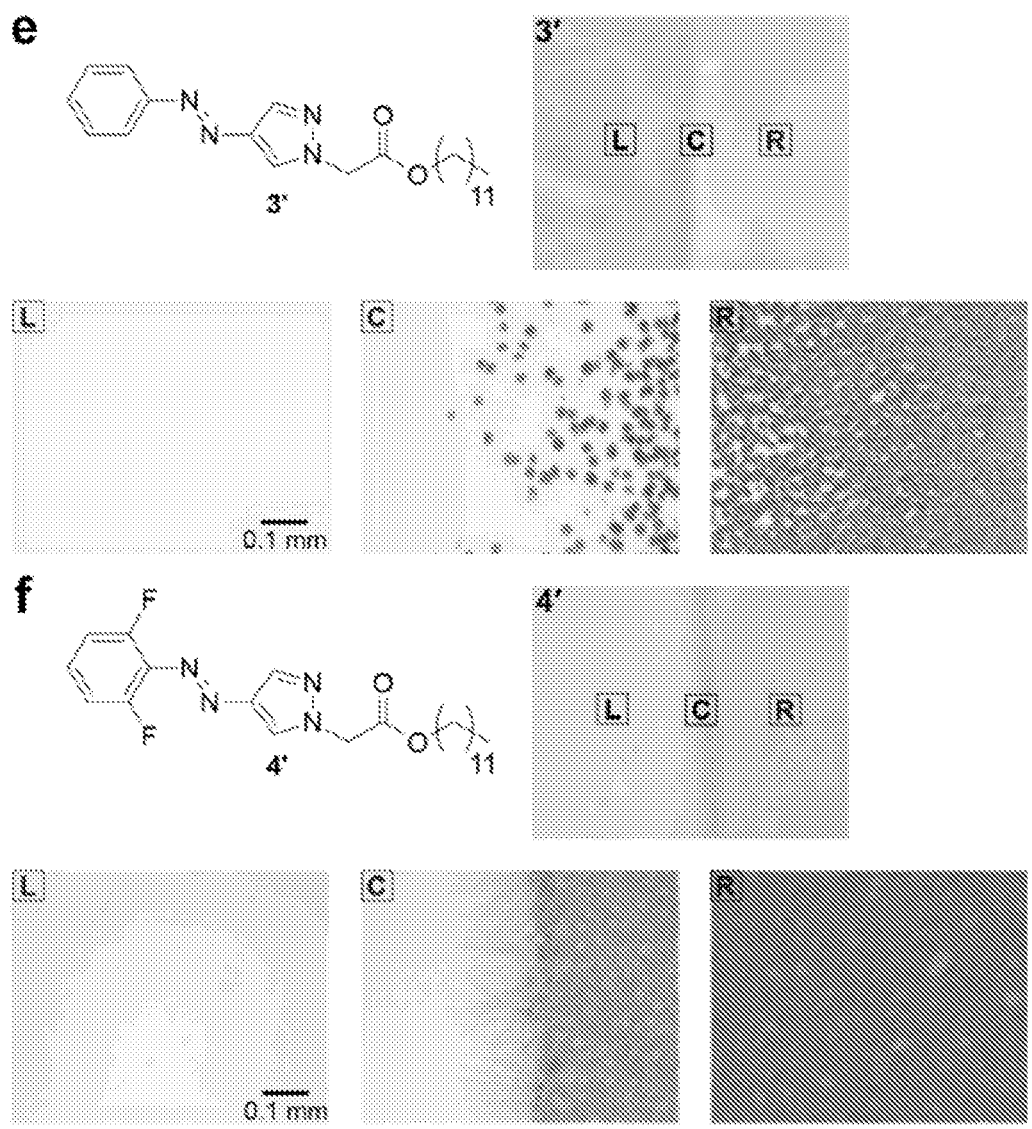

The temporal and spatial control over latent heat release can be demonstrated by the selective crystallization of stable liquid films involving optical masks (FIGS. 13A-13D). The films were partially covered by the mask (typically thick and dense cardboard or plastic) on the left side (L), and crystalline phase formation was found to occur only within the area (right side, R) exposed to light for 5-15 min. The translucent liquid films become opaque after crystallization (right side, R) observed by darker coloring under optical microscope due to increased diffraction. Compounds 1'-4' (represented in FIG. 13A by compound 1') showed a clear interface between the solid and liquid phase and distinct crystalline features of micro scale grains. FIG. 13B shows distinct absorption spectra of E and Z isomers of compound 1', particularly the blue-shifted and diminished n-π* band of E isomer in the visible light region, which led to the prominent color change from orange to yellow upon Z-to-E isomerization. Comparable data for compounds 2'-4' are provided in FIGS. 14A-F.

All films were prepared by melting the solid compounds then cooling to room temperature as described in the method section. Compound 1 was illuminated with 530 nm light at −30, 0, and 25° C. In all cases, the film remained a liquid with a clear boundary between E and Z rich sides of the film. Compound 2 was illuminated with 530 nm at −30 and 0° C. There was no change of phase observed after irradiation (i.e. the entire film remains liquid), and there is no clear boundary observed in the film due to the negligible color change induced by the irradiation. Compound 4 was illuminated with 395 nm at 0 and 25° C. There was no change of phase observed after irradiation (i.e. the entire film remains liquid), and there was no clear boundary observed in the film due to the negligible color change induced by the irradiation. Compound 2' was illuminated at −30° C. with 530 and 395 nm, respectively. Both compounds exhibited optical crystallization on the E rich side of the film (R). Compounds 3' and 4' were illuminated at −30° C. with 395 nm. Both compounds exhibited optical crystallization on the E rich side of the film (R). Comparable data for compounds 2'-4' is provided in the FIGS. 14A-14F. The color change of the compound 3 film (FIG. 13C) after irradiation is not as significant as that for compound 1' (FIG. 13A) because of the similar absorption profile and intensity in visible light range (FIG. 13D) between E and Z isomers of compound 3. Images for compounds 1, 2, and 4 are also provided in FIGS. 14A-14F, demonstrating no crystallization induced by light irradiation. As mentioned above, these compounds remain liquid after Z-to-E switching due to the high supercooling of melt for both isomers.

Figure 7:
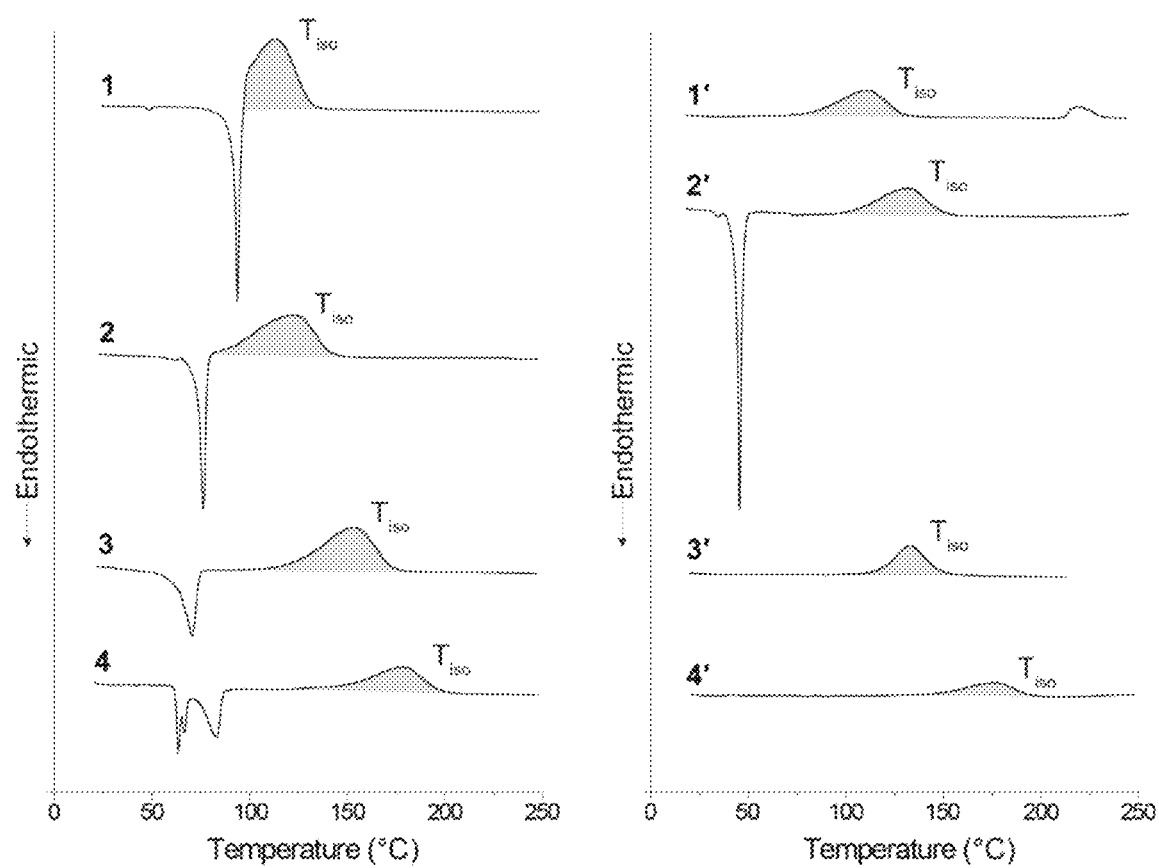
FIG. 7 shows DSC plots illustrating the thermal isomerization of Z isomers for compounds 1-4 and 1'-4' showing the isomerization temperature range ($T_{iso}$) and isomerization energy (integrated area under the exothermic curves, highlighted grey).
Figure 8A:
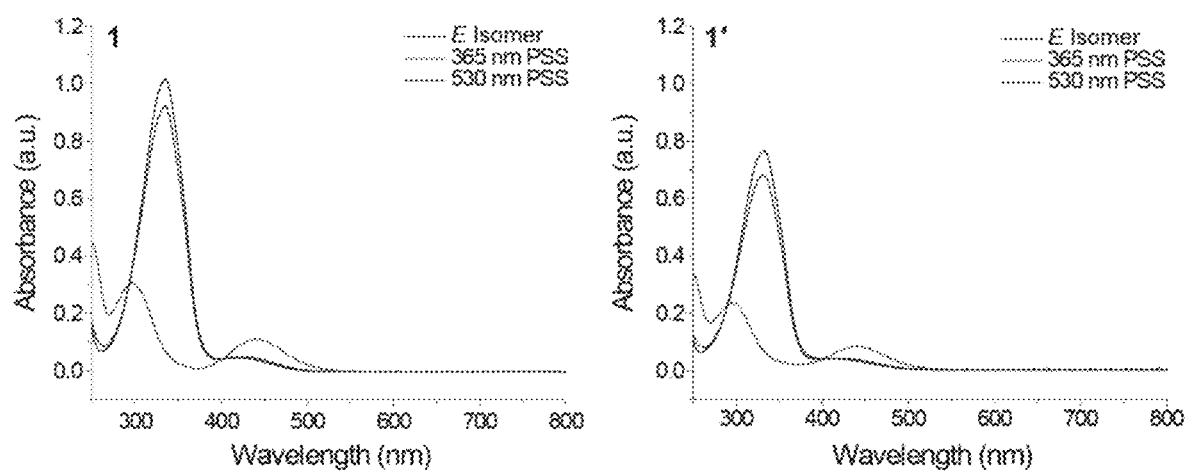
FIGS. 8A-8D shows UV-Vis absorption spectra of compounds 1 and 1' (8A), 2 and 2' (8B), 3 and 3' (8C), and 4 and 4' (8D).
Figure 8B:
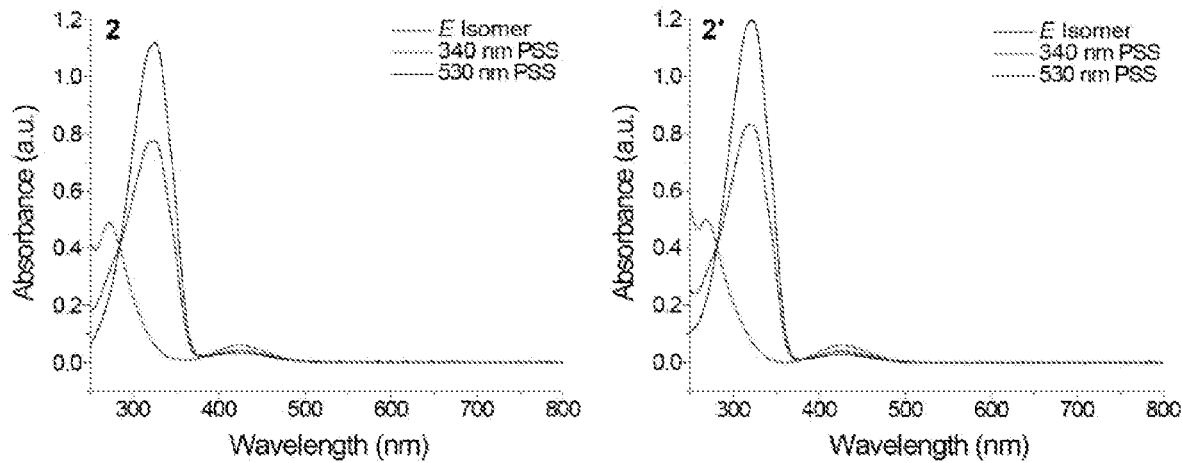
Figure 8C:
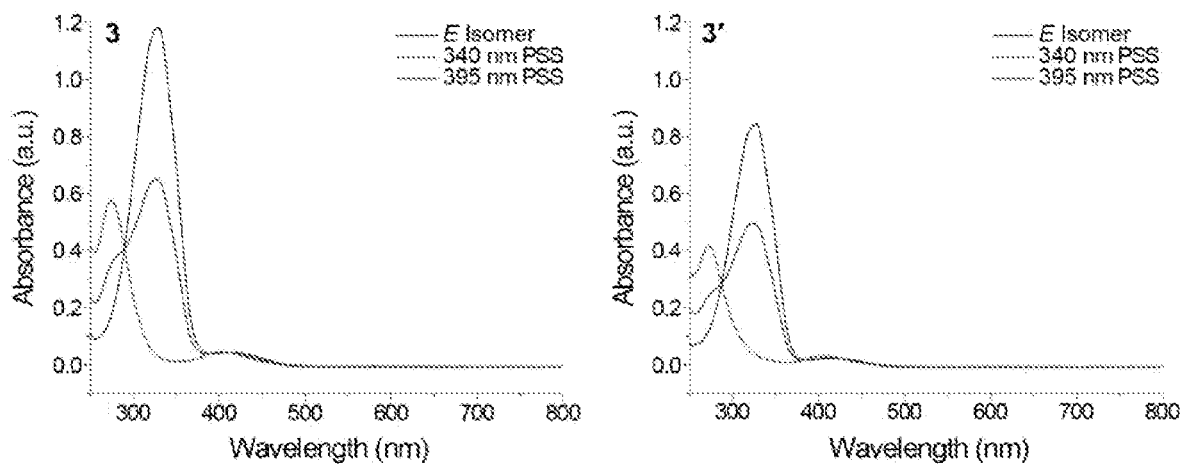
Figure 8D:
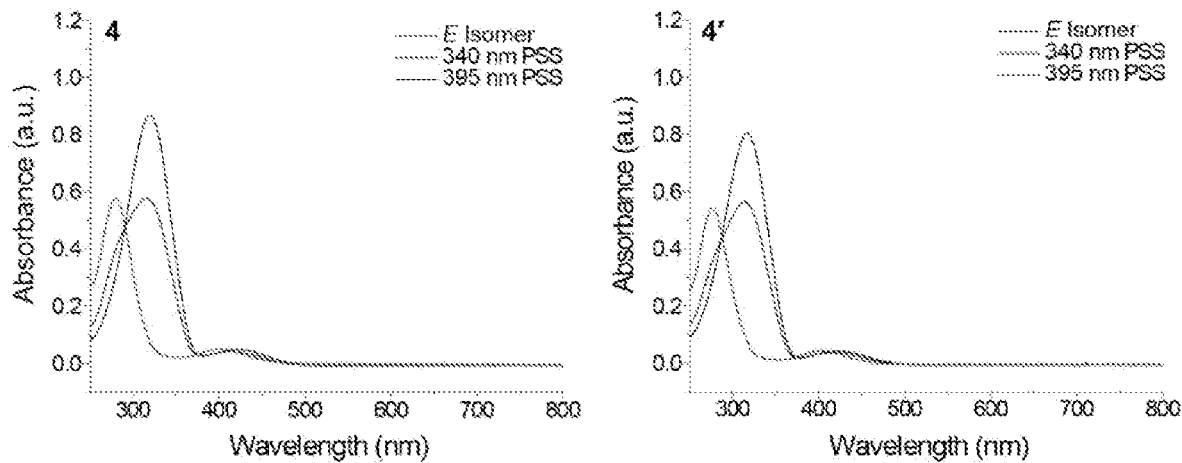
Figure 9A:
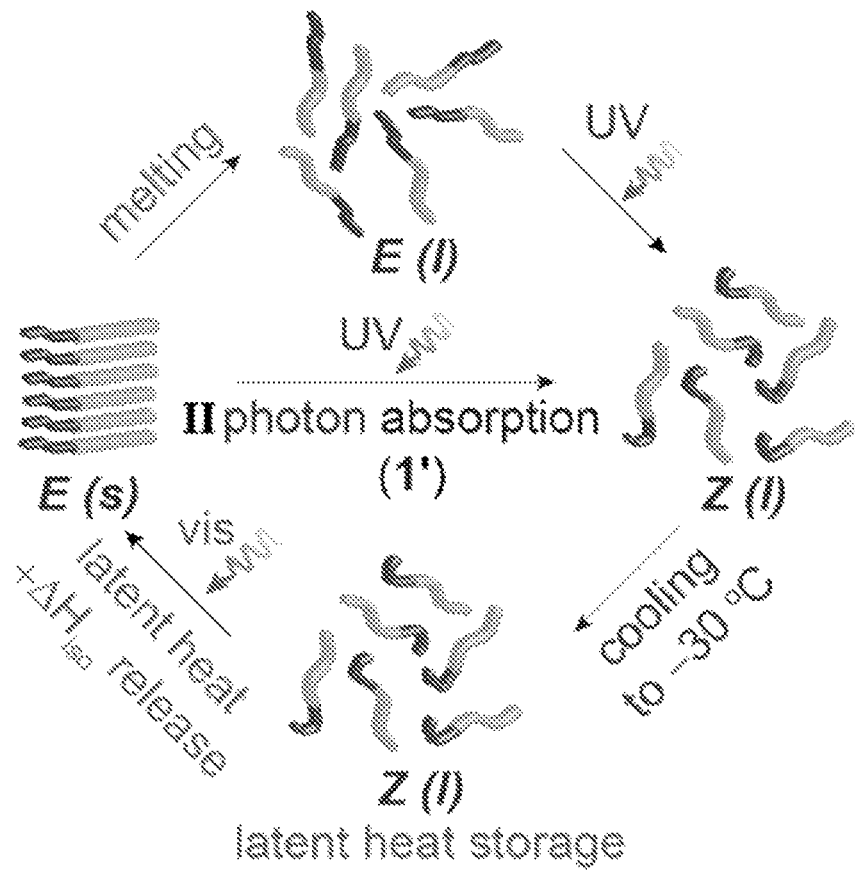
FIG. 9A is a schematic illustration of activation methods I and II for arylazopyrazoles derivatives which store latent heat in stable liquid phase upon activation.
Figure 9B:
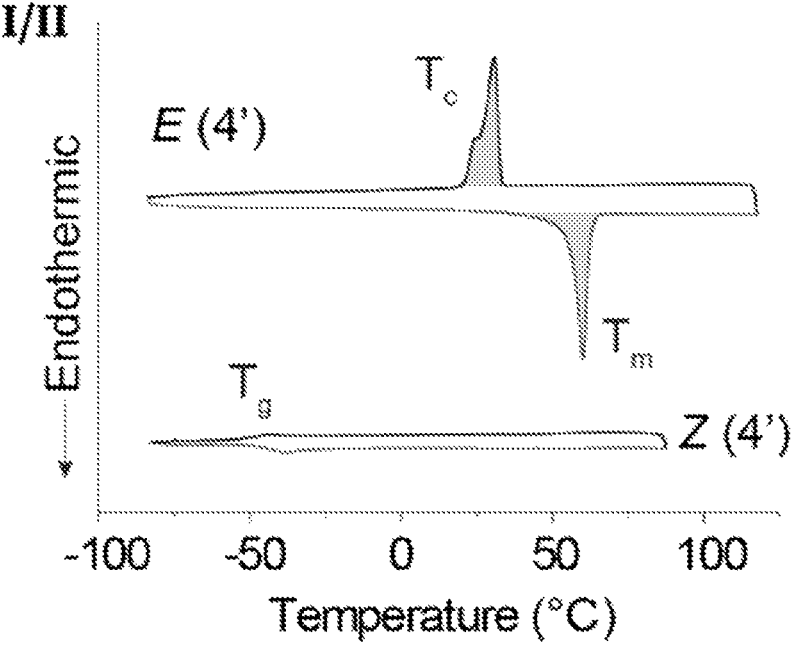
FIG. 9B are differential scanning calorimetry (DSC) plots of E and Z isomers of compound 4' as a representative example of compounds displaying activation methods I and II.
Figure 9C:
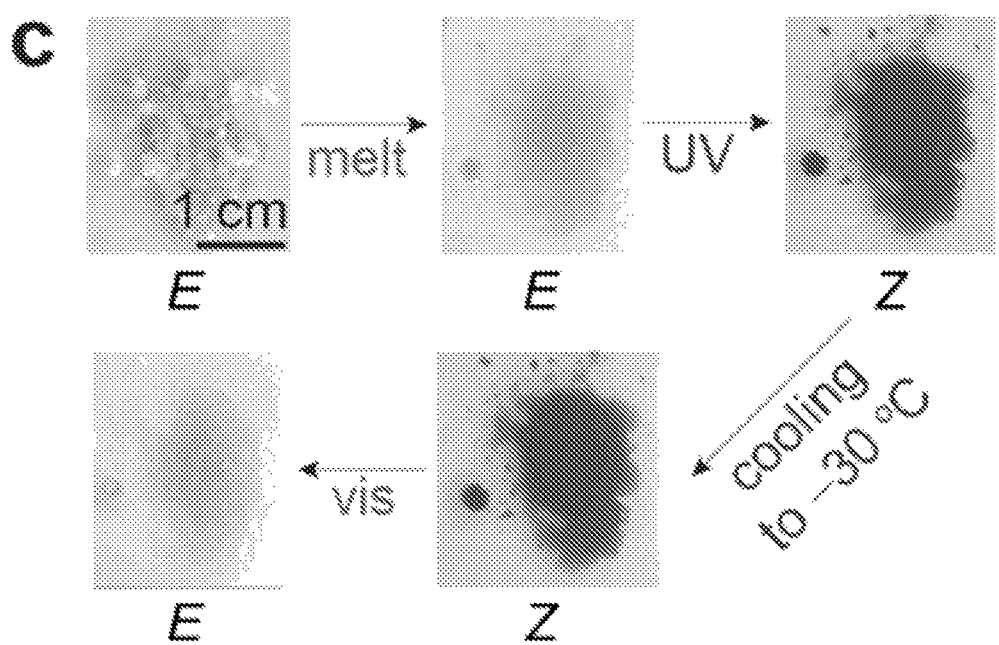
FIG. 9C is a series of optical images of compound 1' in a powder form that undergoes melting, UV irradiation, cooling, and visible-light-induced crystallization according to the activation method I. Compound 1' also directly absorbs UV at room temperature (i.e. in the absence of the first melting process) to form liquid-state Z isomer, according to activation method II. $T_m$: melting point, $T_c$: crystallization point, $T_g$: glass transition point.
Figures 10A, 10B:
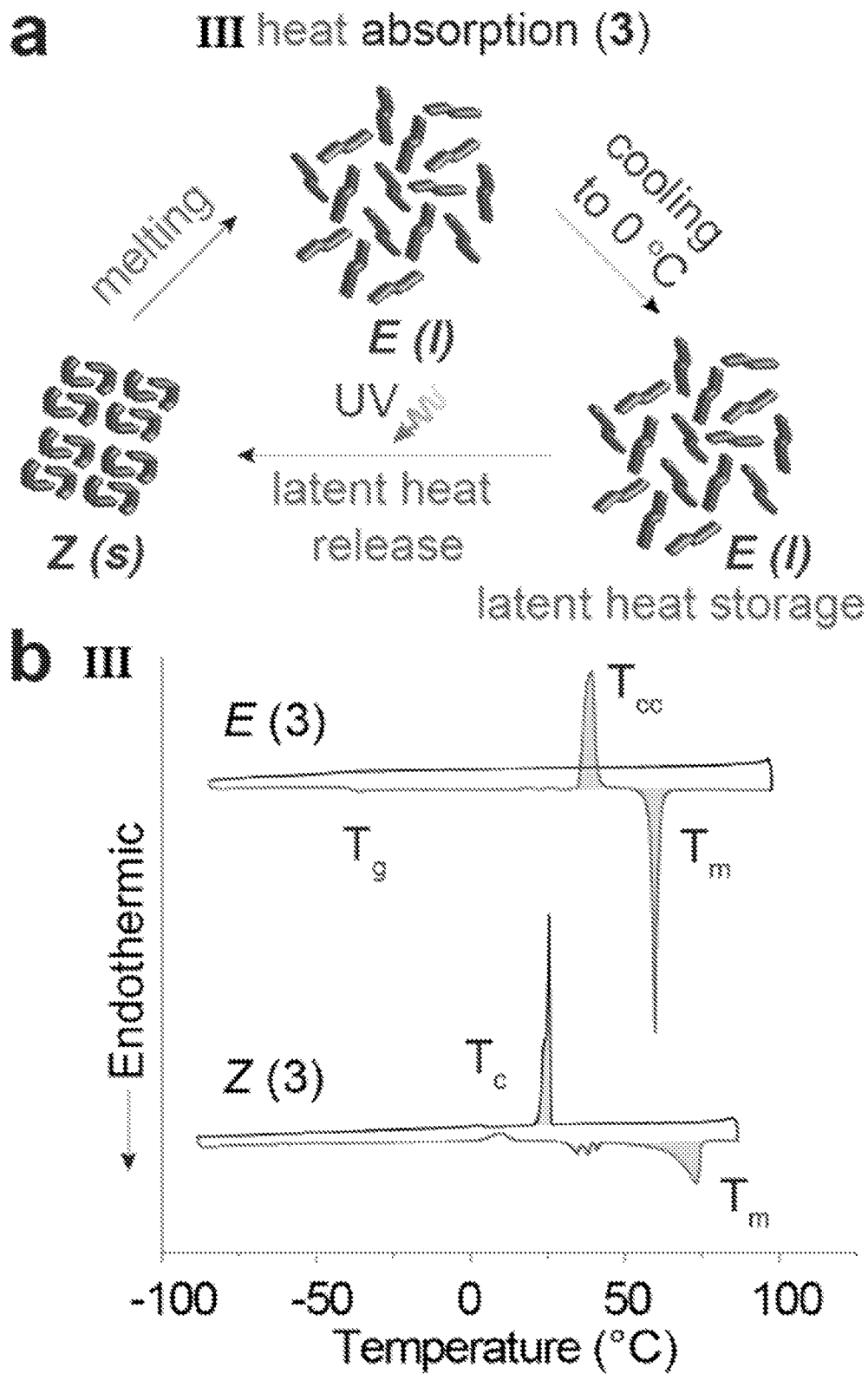
FIG. 10A is a schematic illustration of activation method III for arylazopyrazole derivatives which store latent heat in stable liquid phase upon activation.
FIG. 10B are DSC plots of E and Z isomers of compound 3, the only group III compound that does not require photon absorption for activation. $T_{cc}$: cold-crystallization point.
Figures 11A, 11B, 11C, 11D:
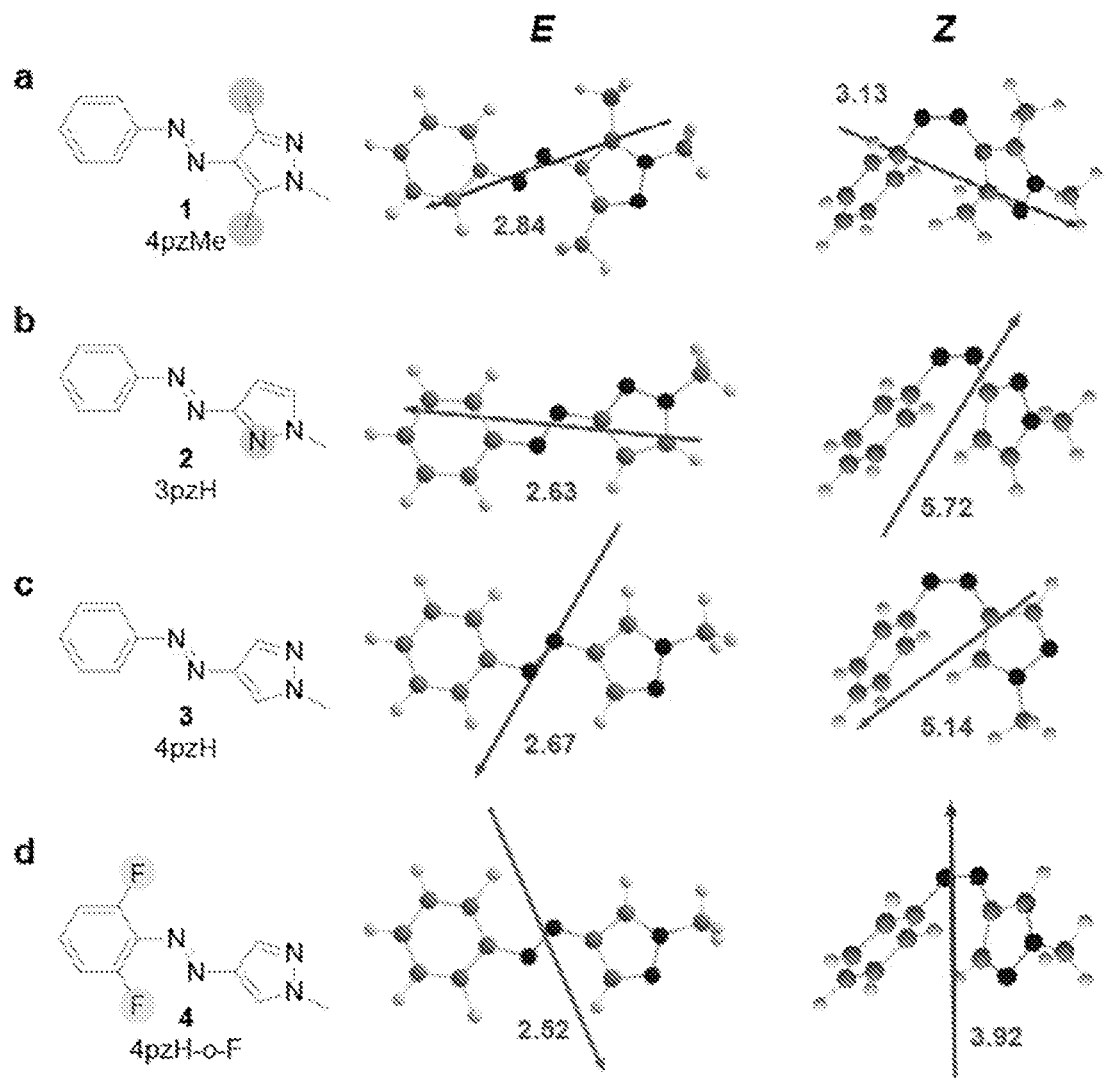
FIGS. 11A-11D show dipole moment calculation (Debye) of parent compound structures.
Figures 12A, 12B, 12C, 12D:
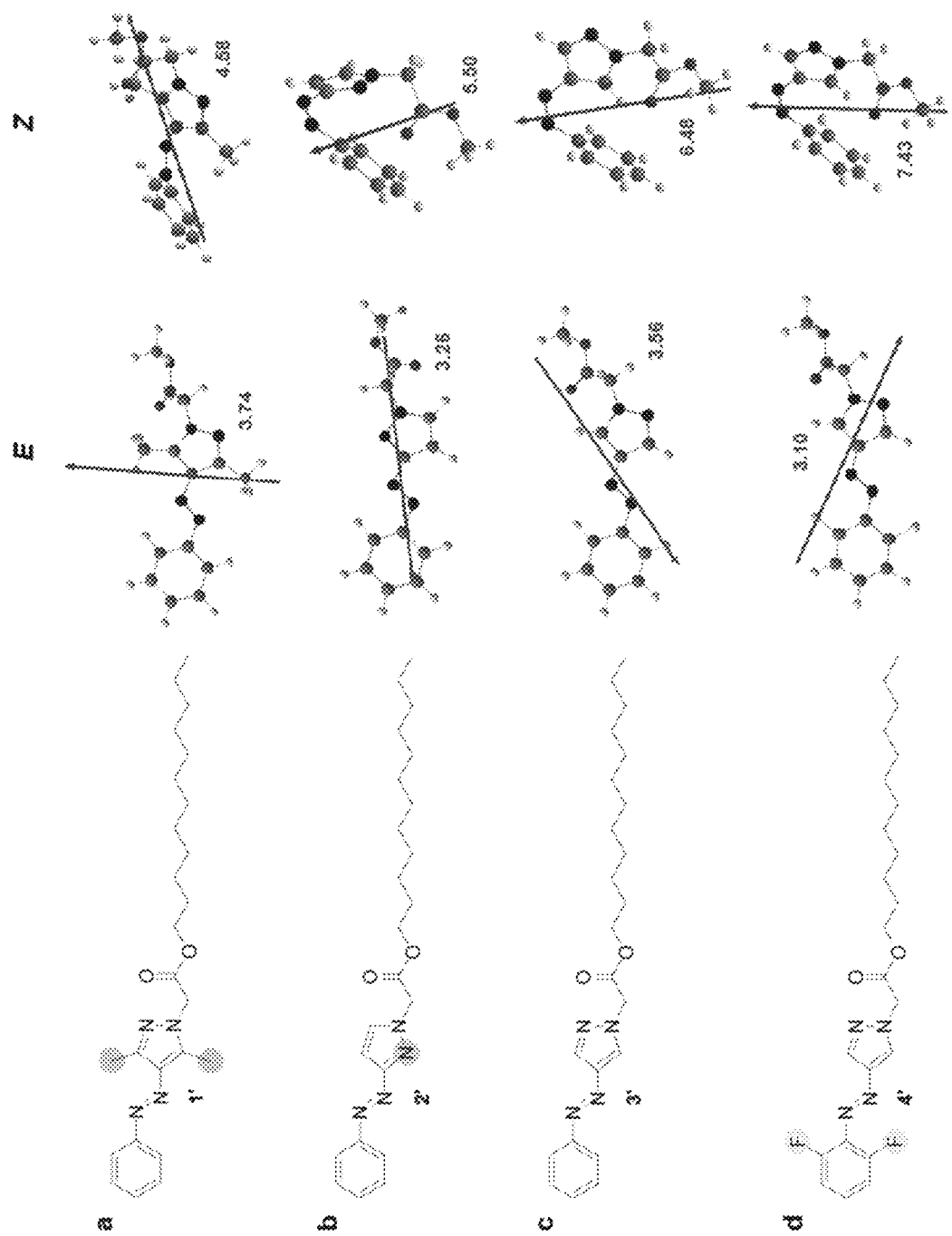
FIGS. 12A-12D show dipole moment calculation (Debye) of dodecanoate derivative structures.

DSC was additionally utilized to measure the isomerization energy (ΔHiso) of Z-to-E switching accompanied by the light-triggered crystallization (FIG. 7). The exothermic peaks appear during the thermal activation of Z isomers in DSC, and the integrated area under the peaks represent ΔHiso. As summarized in Table 3, the thermally-induced isomerization occurred at higher temperatures for compounds with higher thermal stability or longer $t_{1/2}$ ($T_{iso}$ of compound 4>3>2>1; compound 4'>3'>2'>1'). This indicates the higher thermal activation energy (Ea) of Z-to-E isomerization for more stable Z isomers. ΔHiso, on the other hand, decreases as the Z isomer stability is increased ($\Delta H_{iso}$ of compounds: 1>2>3>4; 1'>2' >3'>4'), indicating the lower energy of the more stable Z isomers and corroborating their higher Ea.

TABLE 3

Thermal Parameters Obtained from DSC

| Cmpd | $T_{iso}$ (° C.) | $\Delta H_{iso}$ (kJ/mol) | $\Delta H_c$ (kJ/mol) | $\Delta H_{total}$ (kJ/mol) |
|---|---|---|---|---|
| 1 | 113 | 49 | 17 | 49[a] |
| 2 | 122 | 38 | 22 | 38[a] |
| 3 | 155 | 36 | 12[b] | −24[c] |
| 4 | 181 | 30 | 22 | 30[a] |
| 1' | 117 | 47 | 35 | 82 |
| 2' | 137 | 43 | 49 | 92 |
| 3' | 138 | 39 | 49 | 88 |
| 4' | 179 | 31 | 45 | 76 |

$\Delta H_{total}$ is the total thermal energy release from the optically triggered crystallization process. $T_{iso}$ is measured as peak temperature of exothermic curve observed for thermally-induced Z-to-E isomerization. (a) $\Delta H_{total}=\Delta H_{iso}$ for compounds 1, 2, and 4. (b) $\Delta H_c$ of compound 3 is the crystallization energy of Z isomers. (c) $\Delta H_{total}$ for compound 3 is defined as $\Delta H_c-\Delta H_{iso}$ due to the endothermic E-to-Z photo-isomerization occurring for the crystallization. DSC plots of Z-to-E thermal isomerization are shown in FIG. 7.

Maximum thermal energy release from the optically triggered crystallization process ($\Delta H_{total}$) is calculated by the integration of crystallization energy ($\Delta H_c$) of E isomers and Z-to-E isomerization energy ($\Delta H_{iso}$) for compounds 1', 2', 3', and 4' following the activation method I and II. In the case of incomplete Z-to-E conversion, only a smaller fraction of the $\Delta H_c$ and $\Delta H_{iso}$ will be harnessed upon optically triggered crystallization. The long-term stability of liquid films at −20° C. was examined, observing no crystallization after 2.5 weeks in the case of compounds 3' and 4' (Table 4). Compounds 1' and 2' were stable for 1 day and 7 hours, respectively, due to the lower Z thermal stability (1') and crystallization behavior of Z at −33° C. (2').

TABLE 4

Thin Film stability of the Compounds 3 and 1'-4'

| | Compound | | | | |
|---|---|---|---|---|---|
| | 3 | 1' | 2' | 3' | 4' |
| Film Stability | 2 hours | 1 day | 7 hours | 17 days | 17 days |

Compound 3 stability of the E isomer film was tested at room temperature. Compounds 1'-4' stability of the Z isomer film was tested at −20° C. Thin films were considered to be stable until crystallization was observed under optical microscope. The crystallization of thin films was monitored at the following time intervals: 2 hours, 7 hours, 1 day, 7 days, 14 days, and 17 days.

The compound 3 that is activated by method III results in a negative value of calculated $\Delta H_{total}$ due to the endothermic E-to-Z photo-isomerization required for the crystallization. Since $\Delta H_{iso}$ is larger than $\Delta H_c$ for compound 3, the photo-induced crystallization does not lead to the overall heat release. However, this energy storage scheme can be further developed for net heat release by the judicious design of photo-switches that possess small $\Delta H_{iso}$ and large $\Delta H_c$. This will potentially open up opportunities to investigate other switches including spiropyrans (Klajn, R. "Spiropyran-Based Dynamic Materials," *Chem. Soc. Rev.* 43:148-184 (2014), which is hereby incorporated by reference in its entirety), diarylethenes (Irie et al., "Photochromism of Diarylethene Molecules and Crystals: Memories, Switches, and Actuators," *Chem. Rev.* 114:12174-12277 (2014); Bleger et al., "Visible-Light-Activated Molecular Switches," *Angew. Chem., Int. Ed.* 54:11338-11349 (2015); Boelke et al., "Designing Molecular Photoswitches for Soft Materials Applications," *Adv. Opt. Mater.* 7:1900404 (2019), which are hereby incorporated by reference in their entirety), or various molecular motors (Roke et al., "Visible-Light-Driven Tunable Molecular Motors Based on Oxindole," *J. Am. Chem. Soc.* 141:7622-7627 (2019); Kassem et al., "Artificial Molecular Motors," *Chem. Soc. Rev.* 46:2592-2621 (2017); Oruganti et al., "Quantum Chemical Design of Rotary Molecular Motors," *Int. J. Quantum Chem.* 118: e25405 (2018), which are hereby incorporated by reference in their entirety) which have not been considered as MOST molecules due to their negligible $\Delta H_{iso}$. This scheme generates a stable liquid phase without requiring photo-activation and effectively release latent heat by one-step optical triggering.

There is the potential of utilizing photo-induced phase transitions of the aforementioned classes of switches and motors for latent heat storage by careful structural design. For example, the installation of long alkyl chains can induce crystallinity to materials which can be disrupted by ring opening and closing through photo-irradiation. The substitution pattern of chains on other photo-responsive core structures that would determine the degree of such phase transition is currently under investigation.

A series of arylazopyrazole derivatives functionalized with dodecanoate group were demonstrated to be activated thermally, optically, or in combination, to form stable liquid phase Z isomers over a wide range of temperatures. The liquid phase compounds were then optically triggered to isomerize to crystalline forms, releasing latent heat at low temperatures such as −30° C. The use of an arylazopyrazole core allowed for the long-term storage of latent heat in the liquid state, and the alkanoate group enhances the crystallinity of E isomers while stabilizing the liquid phase of polar Z isomers. This first demonstration of photo-triggered crystallization of molecular switches at temperatures far below 0° C. has significance in applications that require heat release in extreme cold weather that limits ignition of fuels and battery usage. In particular, molecular system described in the present application will be able to absorb waste heat from an operating engine and release it later to warm up engine oil when engine start-up is needed at low temperatures. This waste heat recycling scheme can be applied to other devices that operate intermittently in cold weather, potentially replacing Joule heating (i.e. electrical heating) as conventionally used for such devices. This strategy of molecular designs will be further investigated in other molecular switch systems to improve the energy storage density and to fine-tune the wavelength of light for triggering.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A compound of Formula (I):

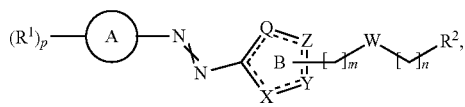

(I)

wherein

---- is a single or a double bond;

$\bigcirc{A}$ is aryl or heteroaryl;

ring B is a heteroaryl ring selected from the group consisting of pyrazolyl, oxazolyl, isoxazolyl, thiazolyl, isothiazolyl, and imidazolyl;

Q is $C(R^3)$ or N;

X is N, C, or C(R');

Y is N, C, or C(R');

Z is N, N(R), O, S, or C(R');

each $R^1$ is independently selected at each occurrence thereof from the group consisting of H, halogen, unsaturated or saturated $C_{1-6}$ hydrocarbon, —CN, —NO$_2$, —OR$^4$, —OC(O)R$^4$, —C(O)OR$^4$, —C(O)R$^4$, —NR$^4$R$^5$ and —C(O)NR$^4$R$^5$, wherein unsaturated or saturated $C_{1-6}$ hydrocarbon can be optionally substituted 1 to 3 times with halogen;

$R^2$ is H or unsaturated or saturated $C_{1-6}$ hydrocarbon;
$R^3$ is H or unsaturated or saturated $C_{1-6}$ hydrocarbon;
$R^4$ is H or unsaturated or saturated $C_{1-50}$ hydrocarbon;
$R^5$ is H or unsaturated or saturated $C_{1-6}$ hydrocarbon;
W is selected from the group consisting of —CH$_2$—, —O—, —C(O)O—, —C(O)S—, and —C(O)NH—;
R is H or $C_{1-6}$ alkyl;
R' is H or $C_{1-6}$ alkyl;
m is 1 or more;
n is 2 or more; and
p is 0, 1, 2, 3, 4, or 5.

2. The compound according of claim 1, wherein $\bigcirc{A}$ is selected from the group consisting of phenyl, naphthyl, imidazolyl, oxazolyl, isoxazolyl, thiazolyl, and isothiazolyl.

3. The compound according of claim 1, wherein the compound of Formula (I) has the structure of Formula (Ia) or Formula (Ib):

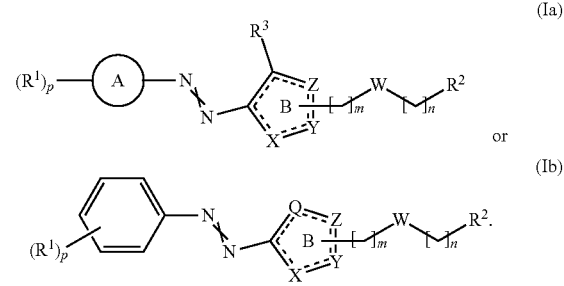

4. The compound according of claim 1, wherein n is 6 to 16.

5. The compound according of claim 1, wherein p is 0, 1, or 2.

6. The compound according of claim 1, wherein the compound of Formula (I) has the structure selected from the group consisting of:

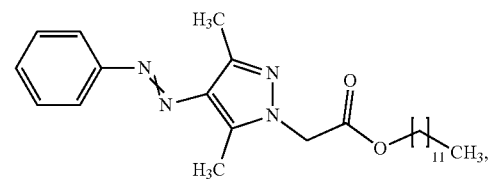

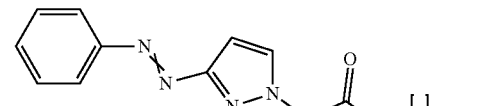

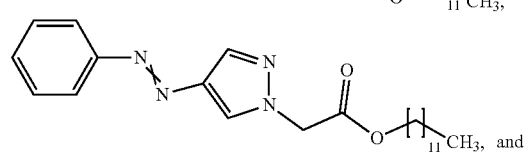

and

-continued

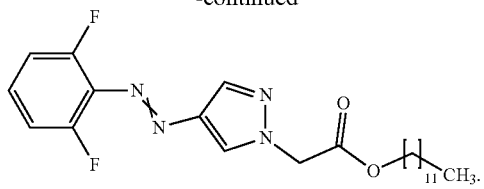

7. The compound according to claim 1, in the form of a Z-isomer.

8. The compound according to claim 1, in the form of an E-isomer.

9. A composition comprising one or more compounds of Formula (I) according to claim 1.

10. The composition according to claim 9, wherein the composition further comprises an organic phase-change material in which the compounds of Formula (I) are dispersed while in the liquid state.

11. A composite structure comprising a porous structural component and a composition according to claim 9.

12. A composite structure comprising a porous structural component and a compound according to claim 1 dispersed in a medium.

13. A process for preparation of a compound of Formula (I) as defined in claim 1, said process comprising:
providing a compound of Formula (II):

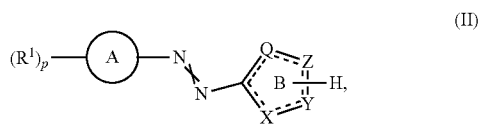

and
forming the compound of Formula (I) from the compound of Formula (II).

14. The process according to claim 13, further comprising providing a compound of Formula (IV):

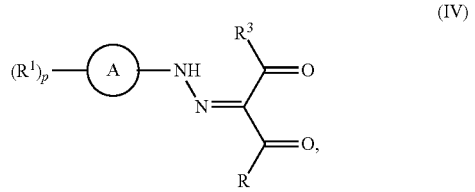

and
forming the compound of Formula (II) from the compound of Formula (IV).

15. The process according to claim 13, further comprising providing a compound of Formula (VIII):

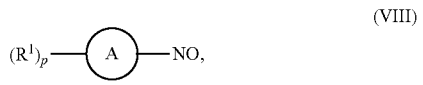

providing a compound of Formula (IX):

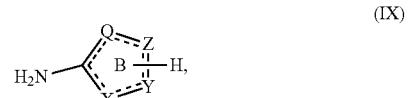

and
reacting the compound of Formula (VIII) with the compound of Formula (IX) under conditions effective to produce the compound of Formula (II).

16. A process for preparation of a product compound of Formula (I) as defined in claim 1, said process comprising:
providing a compound of Formula (X):

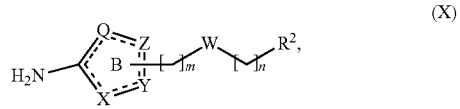

and
forming the compound of Formula (I) from the compound of Formula (X).

17. The process according to claim 16, wherein said forming the compound of Formula (I) comprises reacting the compound of Formula (X) with a compound of Formula (VIII):

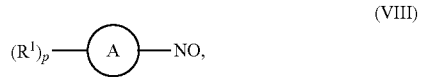

under conditions effective to produce the compound of Formula (I).

18. The process according to claim 16, further comprising providing a compound of Formula (XII):

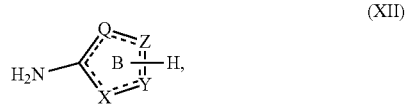

providing a compound of Formula (III):

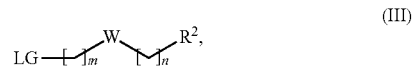

wherein LG is a suitable leaving group; and
reacting the compound of Formula (XII) with the compound of Formula (III) under conditions effective to produce the compound of Formula (XI).

19. A thermal-storage device comprising one or more compounds of Formula (I) according to claim 1, where the one or more compounds is retained on a substrate.

20. A method of storing energy comprising:
providing an energy storage device comprising one or more compounds according to Formula (I), as defined in claim 1, whereby the one or more compounds of Formula (I) are present as an E-isomer;

activating the compounds of Formula (I) to produce a Z-isomer of the one or more compounds according to Formula (I); and storing the Z-isomer of the one or more compounds of Formula (I) for a period of time.

\* \* \* \* \*